US012577463B2

(12) United States Patent
Jang et al.

(10) Patent No.: US 12,577,463 B2
(45) Date of Patent: *Mar. 17, 2026

(54) MULTI-COLOR TUNABLE UPCONVERSION NANOPHOSPHOR

(71) Applicant: KOREA INSTITUTE OF SCIENCE AND TECHNOLOGY, Seoul (KR)

(72) Inventors: Ho Seong Jang, Seoul (KR); Gumin Kang, Seoul (KR); Hyungduk Ko, Seoul (KR); Seung Yong Lee, Seoul (KR); Kwang Rok Mun, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 917 days.

This patent is subject to a terminal disclaimer.

(21) Appl. No.: 17/864,124

(22) Filed: Jul. 13, 2022

(65) Prior Publication Data

US 2023/0037132 A1 Feb. 2, 2023

(30) Foreign Application Priority Data

Jul. 14, 2021 (KR) ........................ 10-2021-0092318

(51) Int. Cl.
C09K 11/77 (2006.01)
C09K 11/02 (2006.01)
(Continued)

(52) U.S. Cl.
CPC .......... *C09K 11/7773* (2013.01); *C09K 11/02* (2013.01); *G01N 21/6428* (2013.01)

(58) Field of Classification Search
CPC ... C09K 11/7773; C09K 11/02; C09K 11/025; C09K 11/7772; C09K 11/616; G01N 21/6428; B82Y 20/00
See application file for complete search history.

(56) References Cited

U.S. PATENT DOCUMENTS 11,680,205 B2 * 6/2023 Jang ................... C09K 11/7773
252/301.36
2015/0252259 A1 * 9/2015 Jin ....................... C09K 11/025
250/459.1
(Continued)

FOREIGN PATENT DOCUMENTS

CN 107286924 A * 10/2017 ............. B82Y 30/00
KR 10-2012-0083077 A 7/2012
(Continued)

OTHER PUBLICATIONS

Machine translation of CN-107286924-A., 25 pages (Year: 2017).*
(Continued)

*Primary Examiner* — Matthew E. Hoban
*Assistant Examiner* — Lynne Edmondson

(57) ABSTRACT

Provided are a core-multishell upconversion nanophosphor capable of being excited by 800±20 nm, 980±20 nm, and 1530±20 nm near-infrared (NIR) light to emit various colors including green, red, blue, and combinations thereof, and a transparent polymer composite including the upconversion nanophosphor. A crystalline shell may be formed between the red, green, and blue emission layers to enable emission of pure red, green, or blue light, and be further formed on an outermost surface to provide a color-tunable and high-brightness upconversion nanophosphor.

16 Claims, 20 Drawing Sheets

PROTECTIVE LAYER

SECOND EMISSION LAYER

SECOND INTERMEDIATE LAYER

ABSORPTION LAYER

FIRST EMISSION LAYER

FIRST INTERMEDIATE LAYER

NANOPHOSPHOR CORE

(51) Int. Cl.
  *C09K 11/61* (2006.01)
  *G01N 21/64* (2006.01)

(56) References Cited

U.S. PATENT DOCUMENTS

| | | | | |
|---|---|---|---|---|
| 2018/0016497 A1* | 1/2018 | Jang | ........................ | H10F 77/45 |
| 2022/0194969 A1 | 6/2022 | Lee | | |

FOREIGN PATENT DOCUMENTS

| | | |
|---|---|---|
| KR | 10-1985471 B1 | 9/2019 |
| KR | 10-2020-0074896 A | 6/2020 |
| KR | 10-2021-0050986 A | 5/2021 |

OTHER PUBLICATIONS

The Office action for Korean Patent Application No. 10-2021-0092318, dated Sep. 7, 2023.

Kwang Rok Mun, "Synthesis of RGB emitting Core/Multi-shell Upconversion Nanophosphors," Feb. 2021, A thesis submitted in partial fulfillment of the requirements for the degnee of Master, Department of Materials Science and Engineering, Korea University, Graduate School.

A-Ra Hong et al., "Orthogonal R/G/B Upconversion Luminescence-based Full-Color Tunable Upconversion Nanophosphors for Transparent Displays," Nano Letters, 2021 American Chemical Society, May 26, 2021, 21, pp. 4838-4844.

A-Ra Hong et al., "Orthogonal R/G/B Upconversion Luminescence-based Full-Color Tunable Upconversion Nanophosphors for Transparent Displays," Nano Letters, 2021 American Chemical Society, May 26, 2021, 21, pp. 4838-4844, Supporting Information.

Franois Auzel, "Upconversion and Anti-Stokes Processes with f and d Ions in Solids," Chem. Rev., 2004, pp. 139-174, vol. 104.

Blasse, G. et al., "Radiative Return to the Ground State: Emission," Luminescent Materials, 1994, pp. 40-45.

Renren Deng et al., "Temporal full-colour tuning through non-steady-state upconversion," Nature Nanotechnology, 2015, pp. 237-242, vol. 10.

* cited by examiner

PROTECTIVE LAYER

SECOND EMISSION LAYER

SECOND INTERMEDIATE LAYER

ABSORPTION LAYER

FIRST EMISSION LAYER

FIRST INTERMEDIATE LAYER

NANOPHOSPHOR CORE

Wavelength (nm)

Wavelength (nm)

MULTI-COLOR TUNABLE UPCONVERSION NANOPHOSPHOR

CROSS-REFERENCE TO RELATED PATENT APPLICATION

This application claims the benefit of Korean Patent Application No. 10-2021-0092318, filed on Jul. 14, 2021, in the Korean Intellectual Property Office, the disclosure of which is incorporated herein in its entirety by reference.

BACKGROUND

1. Field of the Invention

The present invention relates to an upconversion nanophosphor applicable to transparent displays and anti-counterfeiting technologies and a method of synthesizing the upconversion nanophosphor and, more particularly, to a full-color tunable hexagonal fluoride core/multishell upconversion nanophosphor capable of emitting various colors including red (R), green (G), blue (B), and combinations thereof by controlling an applied infrared (NIR) laser wavelength.

2. Description of the Related Art

Most nanophosphors doped with lanthanide elements absorb high-energy light such as ultraviolet (UV) or visible light from the outside and emit visible light with a longer wavelength than the absorbed light. The difference between the absorption wavelength and the emission wavelength is called a Stokes shift. At this time, some lanthanide elements cause an anti-Stokes shift by which the nanophosphor is excited by infrared (IR) light and emits light having a shorter wavelength than the excitation light, i.e., higher-energy visible light. This type of luminescence is called upconversion luminescence because the energy of the emitted light is increased compared to the energy of the light that excites the nanophosphor [Chem. Rev. vol. 104, 139-174 (2004)]. In general, an upconversion nanophosphor doped with a lanthanide element exhibits a unique emission color based on the doped lanthanide element regardless of the type of a host [Luminescent Materials (1994)]. Blue light is emitted when thulium (Tm) is doped, and green or red light is emitted when erbium (Er) or holmium (Ho) is doped on the host of the nanophosphor. That is, one color is emitted from a single-composition nanophosphor. Therefore, to implement a variety of emission colors from the upconversion nanophosphor, nanophosphors of various compositions need to be synthesized.

However, when upconversion nanophosphors of various compositions are mixed, light corresponding to a mixture of colors separately emitted from the nanophosphors of different compositions is ultimately emitted. Due to such characteristics, the upconversion nanophosphor may not be easily applied to 3-dimensional transparent displays. To solve this problem, a research team led by professor Liu from the National University of Singapore has synthesized a core/quad-shell upconversion nanophosphor and proposed a method of implementing various emission colors such as blue, green, red, and white from one nanophosphor particle by using two different-wavelength laser beams and a laser pulse controller [Nature Nanotechnology vol. 10, 237-242 (2015)]. However, because the intensity of upconversion luminescence is greatly reduced when the pulse of the applied laser beam is shortened, a variety of emission colors may not be easily implemented while maintaining high brightness. In addition, when blue light is emitted due to 808 nm NIR excitation, the core/quad-shell upconversion nanophosphor has exhibited very low efficiency. Therefore, when the upconversion nanophosphor may emit red/green/blue light with higher efficiency, implementation of various colors on 3-dimensional transparent displays without a reduction in brightness may be expected.

SUMMARY OF THE INVENTION

Provided is an upconversion nanophosphor capable of emitting visible light of blue, green, or red based on a laser excitation wavelength by using a core provided as a hexagonal NaErF4:Tm nanophosphor, a green-emitting shell provided around the core, a blue-emitting shell provided around the green-emitting shell, and of emitting visible light of various colors by combining various laser wavelengths. In this case, a crystalline shell may be formed between the red, green, and blue emission layers to enable emission of pure red, green, or blue light, and be further formed on an outermost surface to provide a color-tunable and high-brightness upconversion nanophosphor. Also provided is a core/multishell nanophosphor capable of tuning an emission color merely by doping an activator on an intermediate layer based on diffusion of the activator without using a plurality of activators to emit various colors. Also provided is an upconversion nanophosphor capable of emitting green, red, blue, and various other colors by changing compositions of red-, green-, and blue-emitting core and shells.

According to an aspect of the present invention, there is provided a hexagonal core/multishell upconversion nanophosphor capable of being excited by 800±20 nm, 980±20 nm, and 1530±20 nm near-infrared (NIR) light to emit blue, green, red, and combinations thereof.

The hexagonal core/multishell upconversion nanophosphor may have a core/multishell structure including a core provided as a $Tm^{3+}$-doped fluoride nanoparticle represented by Chemical Formula 1, a crystalline shell represented by Chemical Formula 2, a green-emitting shell having a $Yb^{3+}$, $Er^{3+}$-co-doped crystalline composition represented by Chemical Formula 3, an absorption shell having a $Nd^{3+}$, $Yb^{3+}$-co-doped crystalline composition represented by Chemical Formula 4, a crystalline shell represented by Chemical Formula 5, a blue-emitting shell having a $Tm^{3+}$-doped crystalline composition represented by Chemical Formula 6, and an outermost shell provided as a crystalline shell represented by Chemical Formula 7.

$$NaEr_{1-a-b}L_bF_4:Tm^{3+}_a \qquad \text{[Chemical Formula 1]}$$

(In Chemical Formula 1, a is a real number of $0 \le a \le 0.5$, b is a real number of $0 \le b < 1$ and $0 \le a+b < 1$ and is selected within a range satisfying $a+b < 1$, and L is any one selected from the group consisting of yttrium (Y), lanthanum (La), cerium (Ce), praseodymium (Pr), neodymium (Nd), promethium (Pm), samarium (Sm), europium (Eu), terbium (Tb), dysprosium (Dy), holmium (Ho), ytterbium (Yb), lutetium (Lu), gadolinium (Gd), and combinations thereof.)

$$NaY_{1-c}M_cF_4 \qquad \text{[Chemical Formula 2]}$$

(In Chemical Formula 2, c is a real number of $0 \le c \le 1$, M is any one selected from the group consisting of rare-earth elements and combinations thereof, and the rare-earth elements for M include any one selected from the group consisting of La, Ce, Pr, Nd, Pm, Sm, Eu, Gd, Tb, Dy, Ho, erbium (Er), thulium (Tm), Yb, and Lu.)

$$NaY_{1-d-e-f}N_fF_4:Yb^{3+}_d,Er^{3+}_e \qquad \text{[Chemical Formula 3]}$$

(In Chemical Formula 3, d is a real number of $0 \leq d \leq 1$, e is a real number of $0 \leq e \leq 1$, d and e are selected within a range satisfying a condition of $0 < d+e \leq 1$, f is a real number of $0 \leq f < 1$ and is selected within a range satisfying a condition of $0 < d+e+f \leq 1$, N is any one selected from the group consisting of rare-earth elements and combinations thereof, and the rare-earth elements for N include any one selected from the group consisting of La, Ce, Pr, Nd, Pm, Sm, Eu, Gd, Tb, Dy, Ho, Tm, and Lu.)

$$NaLu_{1-g-h-i}Q_iF_4{:}Nd^{3+}{}_g{,}Yb^{3+}{}_h \qquad \text{[Chemical Formula 4]}$$

(In Chemical Formula 4, g is a real number of $0 < g \leq 1$, h is a real number of $0 \leq h \leq 0.5$ and is selected within a range satisfying a condition of $0 < g+h \leq 1$, i is a real number of $0 \leq i < 1$ and is selected within a range satisfying a condition of $0 < g+h+i \leq 1$, Q is any one selected from the group consisting of rare-earth elements and combinations thereof, and the rare-earth elements for Q include any one selected from the group consisting of La, Ce, Pr, Pm, Sm, Eu, Gd, Tb, Dy, Ho, Er, Tm, and Y.)

$$NaY_{1-j}R_jF_4 \qquad \text{[Chemical Formula 5]}$$

(In Chemical Formula 5, j is selected within a range satisfying a condition of a real number of $0 \leq j \leq 1$, R is any one selected from the group consisting of rare-earth elements and combinations thereof, and the rare-earth elements for R include any one selected from the group consisting of La, Ce, Pr, Nd, Pm, Sm, Eu, Gd, Tb, Dy, Ho, Er, Tm, Yb, and Lu.)

$$NaYb_{1-k-l}T_lF_4{:}Tm^{3+}{}_k \qquad \text{[Chemical Formula 6]}$$

(In Chemical Formula 6, k is a real number of $0 < k < 1$, l is a real number of $0 \leq l < 1$ and is selected within a range satisfying a condition of $0 < k+l < 1$, T is any one selected from the group consisting of rare-earth elements and combinations thereof, and the rare-earth elements for T include any one selected from the group consisting of Y, La, Ce, Pr, Nd, Pm, Sm, Eu, Gd, Tb, Dy, Ho, Er, and Lu.)

$$NaY_{1-m}Z_mF_4 \qquad \text{[Chemical Formula 7]}$$

(In Chemical Formula 7, m is selected within a range satisfying a condition of a real number of $0 \leq m \leq 1$, Z is any one selected from the group consisting of rare-earth elements and combinations thereof, and the rare-earth elements for Z include any one selected from the group consisting of La, Ce, Pr, Nd, Pm, Sm, Eu, Gd, Tb, Dy, Ho, Er, Tm, Yb, and Lu.)

The hexagonal core/multishell upconversion nanophosphor may have a core/multishell structure including a core provided as a $Tm^{3+}$-doped fluoride nanoparticle represented by Chemical Formula 8, a crystalline shell represented by Chemical Formula 9, a green-emitting shell having a $Yb^{3+}$, $Er^{3+}$-co-doped crystalline composition represented by Chemical Formula 10, an absorption shell having a $Nd^{3+}$, $Yb^{3+}$-co-doped crystalline composition represented by Chemical Formula 11, a crystalline shell represented by Chemical Formula 12, a red-emitting shell having a $Tm^{3+}$-doped crystalline composition represented by Chemical Formula 13, and an outermost shell provided as a crystalline shell represented by Chemical Formula 14.

$$NaGd_{1-k-l-m}T_mF_4{:}Yb_l{,}Tm^{3+}{}_k \qquad \text{[Chemical Formula 8]}$$

(In Chemical Formula 8, k is a real number of $0 < k < 1$, l is a real number of $0 < l < 1$, m is a real number of $0 \leq m < 1$, l and m are selected within a range satisfying a condition of $0 < k+l+m \leq 1$, and T is any one selected from the group consisting of Y, La, Ce, Pr, Nd, Pm, Sm, Eu, Tb, Dy, Ho, Er, Lu, and combinations thereof.)

$$NaY_{1-c}M_cF_4 \qquad \text{[Chemical Formula 9]}$$

(In Chemical Formula 9, c is a real number of $0 \leq c \leq 1$, M is any one selected from the group consisting of rare-earth elements and combinations thereof, and the rare-earth elements include any one selected from the group consisting of La, Ce, Pr, Nd, Pm, Sm, Eu, Gd, Tb, Dy, Ho, Er, Tm, Yb, and Lu.)

$$NaY_{1-d-e-f}N_fF_4{:}Yb^{3+}{}_d{,}Er^{3+}{}_e \qquad \text{[Chemical Formula 10]}$$

(In Chemical Formula 10, d is a real number of $0 \leq d \leq 1$, and e is a real number of $0 \leq e \leq 1$, d and e are selected within a range satisfying a condition of $0 < d+e \leq 1$, f is a real number of $0 \leq f < 1$ and is selected within a range satisfying a condition of $0 < d+e+f \leq 1$, N is any one selected from the group consisting of rare-earth elements and combinations thereof, and the rare-earth elements for N include any one selected from the group consisting of La, Ce, Pr, Nd, Pm, Sm, Eu, Gd, Tb, Dy, Ho, Tm, and Lu.)

$$NaLu_{1-g-h-i}Q_iF_4{:}Nd^{3+}{}_g{,}Yb^{3+}{}_h \qquad \text{[Chemical Formula 11]}$$

(In Chemical Formula 11, g is a real number of $0 < g \leq 1$, h is a real number of $0 \leq h \leq 0.5$ and is selected within a range satisfying a condition of $0 < g+h \leq 1$, i is a real number of $0 \leq i < 1$ and is selected within a range satisfying a condition of $0 < g+h+i \leq 1$, Q is any one selected from the group consisting of rare-earth elements and combinations thereof, and the rare-earth elements for Q include any one selected from the group consisting of La, Ce, Pr, Pm, Sm, Eu, Gd, Tb, Dy, Ho, Er, Tm, and Y.)

$$NaY_{1-j}R_jF_4 \qquad \text{[Chemical Formula 12]}$$

(In Chemical Formula 12, j is selected within a range satisfying a condition of a real number of $0 \leq j \leq 1$, R is any one selected from the group consisting of rare-earth elements and combinations thereof, and the rare-earth elements for R include any one selected from the group consisting of La, Ce, Pr, Nd, Pm, Sm, Eu, Gd, Tb, Dy, Ho, Er, Tm, Yb, and Lu.)

$$NaEr_{1-a-b}L_bF_4{:}Tm^{3+}{}_a \qquad \text{[Chemical Formula 13]}$$

(In Chemical Formula 13, a is a real number of $0 \leq a \leq 0.5$, b is a real number of $0 \leq b < 1$ and $0 \leq a+b < 1$ and is selected within a range satisfying $a+b < 1$, and L is any one selected from the group consisting of Y, La, Ce, Pr, Nd, Pm, Sm, Eu, Tb, Dy, Ho, Yb, Lu, Gd, and combinations thereof.)

$$NaY_{1-m}Z_mF_4 \qquad \text{[Chemical Formula 14]}$$

(In Chemical Formula 14, m is selected within a range satisfying a condition of a real number of $0 \leq m \leq 1$, Z is any one selected from the group consisting of rare-earth elements and combinations thereof, and the rare-earth elements for Z include any one selected from the group consisting of La, Ce, Pr, Nd, Pm, Sm, Eu, Gd, Tb, Dy, Ho, Er, Tm, Yb, and Lu.)

BRIEF DESCRIPTION OF THE DRAWINGS

The above and other features and advantages of the present invention will become more apparent by describing in detail embodiments thereof with reference to the attached drawings in which.

DETAILED DESCRIPTION OF THE INVENTION

Figure 1:
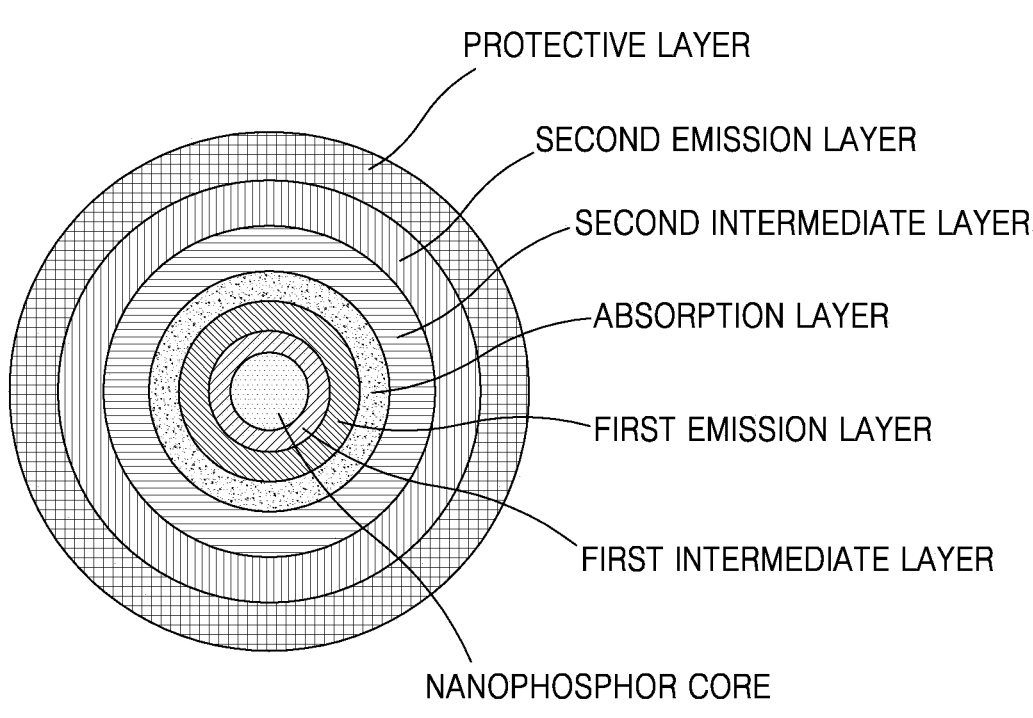
FIG. 1 is a cross-sectional view of a core/shell/shell/shell/shell/shell nanophosphor according to an embodiment of the present invention.

In this specification, a 'first structure/second structure' refers to a structure in which a second structure is provided at or on at least a partial surface of a first structure and, for example, the second structure may have a form surrounding at least a part of the first structure. In this case, the first structure may correspond to a core in a core-shell structure, and the second structure may correspond to a shell surrounding at least a part of the core in the core-shell structure.

Furthermore, a 'first structure/second structure/third structure' refers to a structure in which a third structure is provided at or on at least a partial surface of a first structure and a second structure and, for example, the third structure may have a form surrounding at least a part of the first and second structures. In this case, the first structure may correspond to a core in a core/first shell/second shell structure, the second structure may correspond to a first shell surrounding at least a part of the core in the core/first shell/second shell structure, and the third structure may correspond to a second shell surrounding at least a part of the core and the first shell in the core/first shell/second shell structure.

Meanwhile, based on the above definitions, the present invention may extend to the concept of an $n^{th}$ structure (where n is a positive integer greater than or equal to 4) provided on the first structure/second structure/third structure.

Because an element substituted by an activator or sensitizer doped to synthesize a phosphor is subtracted from a host, when the host is represented at the left side and the activator or sensitizer is represented at the right side of a colon (:) in a chemical formula representing the phosphor, the chemical formula may use subscripts for both in the strict sense due to the subtraction of the doped element from the host. However, in general, the host may be represented by only its original composition without using subscripts.

An upconversion nanophosphor according to an embodiment of the present invention includes a red-emitting nanophosphor core/crystalline shell (first intermediate layer)/green-emitting shell (first emission layer)/absorption shell (absorption layer)/crystalline shell (second intermediate layer)/blue-emitting shell (second emission layer)/crystalline shell (protective layer) structure.

The upconversion nanophosphor according to an embodiment of the present invention includes a core/multishell upconversion nanophosphor including a red-emitting core provided as a $Tm^{3+}$-doped fluoride nanoparticle represented by Chemical Formula 1, a crystalline shell represented by Chemical Formula 2, a green-emitting shell having a $Yb^{3+}$-doped or $Yb^{3+}$, $Er^{3+}$-co-doped crystalline composition represented by Chemical Formula 3, an absorption shell having a $Nd^{3+}$, $Yb^{3+}$-co-doped crystalline composition represented by Chemical Formula 4, a crystalline shell represented by Chemical Formula 5, a blue-emitting shell having a $Tm^{3+}$-doped crystalline composition represented by Chemical Formula 6, and an outermost shell provided as a crystalline shell represented by Chemical Formula 7.

$$NaEr_{1-a-b}L_bF_4:Tm^{3+}_a \qquad \text{[Chemical Formula 1]}$$

In Chemical Formula 1, a is a real number of $0 \leq a \leq 0.5$, b is a real number of $0 \leq b < 1$ and $0 \leq a+b < 1$ and is selected within a range satisfying $a+b < 1$, and L is any one selected from the group consisting of yttrium (Y), lanthanum (La), cerium (Ce), praseodymium (Pr), neodymium (Nd), promethium (Pm), samarium (Sm), europium (Eu), terbium (Tb), dysprosium (Dy), holmium (Ho), ytterbium (Yb), lutetium (Lu), gadolinium (Gd), and combinations thereof.

The nanophosphor may include a core including the nanoparticle, and a shell provided on the surface of the core, and the shell may be made of a compound represented by Chemical Formula 2.

$$NaY_{1-c}M_cF_4 \qquad \text{[Chemical Formula 2]}$$

In Chemical Formula 2, c is a real number of $0 \leq c \leq 1$, and M is any one selected from the group consisting of rare-earth elements and combinations thereof. The rare-earth elements include any one selected from the group consisting of La, Ce, Pr, Nd, Pm, Sm, Eu, Gd, Tb, Dy, Ho, erbium (Er), thulium (Tm), Yb, and Lu.

The nanophosphor may include a core/shell including the nanoparticle, and a shell provided on the surface of the core/shell, and the shell may be made of a compound represented by Chemical Formula 3.

$$NaY_{1-d-e-f}N_fF_4Yb^{3+}_d,Er^{3+}_e \qquad \text{[Chemical Formula 3]}$$

In Chemical Formula 3, d is a real number of $0 \leq d \leq 1$, and e is a real number of $0 \leq e \leq 1$, and more strictly, a real number of $0 \leq e \leq 0.5$. When e is greater than 0.5, an intensity of green emission may be reduced and the emission color may be changed. Herein, d and e are selected within a range satisfying a condition of $0 < d+e \leq 1$.

In Chemical Formula 3, f is a real number of $0 \leq f < 1$ and is selected within a range satisfying a condition of $0 < d+e+f \leq 1$, and N is any one selected from the group consisting of rare-earth elements and combinations thereof. The rare-earth elements include any one selected from the group consisting of La, Ce, Pr, Nd, Pm, Sm, Eu, Gd, Tb, Dy, Ho, Tm, and Lu.

The nanophosphor may include a core/shell/shell including the nanoparticle, and a shell provided on the surface of the core/shell/shell, and the shell may be made of a compound represented by Chemical Formula 4.

$$NaLu_{1-g-h-i}Q_iF_4:Nd^{3+}_g,Yb^{3+}_h \qquad \text{[Chemical Formula 4]}$$

In Chemical Formula 4, g is a real number of $0 < g \leq 1$, and h is a real number of $0 \leq h \leq 0.5$ and is selected within a range satisfying a condition of $0 < g+h \leq 1$.

In Chemical Formula 4, i is a real number of $0 \leq i < 1$ and is selected within a range satisfying a condition of $0 < g+h+i \leq 1$, and Q is any one selected from the group consisting of rare-earth elements and combinations thereof.

The rare-earth elements include any one selected from the group consisting of La, Ce, Pr, Pm, Sm, Eu, Gd, Tb, Dy, Ho, Er, Tm, and Y.

The nanophosphor may include a core/shell/shell/shell including the nanoparticle, and a shell provided on the surface of the core/shell/shell/shell, and the shell may be made of a compound represented by Chemical Formula 5.

$$NaY_{1-j}R_jF_4 \qquad \text{[Chemical Formula 5]}$$

In Chemical Formula 5, j is selected within a range satisfying a condition of a real number of $0 \leq j \leq 1$.

In Chemical Formula 5, R is any one selected from the group consisting of rare-earth elements and combinations thereof.

The rare-earth elements include any one selected from the group consisting of La, Ce, Pr, Nd, Pm, Sm, Eu, Gd, Tb, Dy, Ho, Er, Tm, Yb, and Lu.

The nanophosphor may include a core/shell/shell/shell/shell including the nanoparticle, and a shell provided on the surface of the core/shell/shell/shell/shell, and the shell may be made of a compound represented by Chemical Formula 6.

$$NaYb_{1-k-l}T_lF_4:Tm^{3+}_k \qquad \text{[Chemical Formula 6]}$$

In Chemical Formula 6, k is a real number of $0 < k < 1$, and more strictly, a real number of $0 < k \leq 0.5$. When k is greater than 0.5, an intensity of emission may be reduced. Herein, l is a real number of $0 \leq l < 1$ and is selected within a range satisfying a condition of $0 < k+l < 1$.

In Chemical Formula 6, T is any one selected from the group consisting of rare-earth elements and combinations thereof.

The rare-earth elements include any one selected from the group consisting of Y, La, Ce, Pr, Nd, Pm, Sm, Eu, Gd, Tb, Dy, Ho, Er, and Lu.

The nanophosphor may include a core/shell/shell/shell/shell/shell including the nanoparticle, and a shell provided on the surface of the core/shell/shell/shell/shell/shell, and the shell may be made of a compound represented by Chemical Formula 7.

$$NaY_{1-m}Z_mF_4 \qquad \text{[Chemical Formula 7]}$$

In Chemical Formula 7, m is selected within a range satisfying a condition of a real number of $0 \leq m \leq 1$.

In Chemical Formula 7, Z is any one selected from the group consisting of rare-earth elements and combinations thereof.

The rare-earth elements include any one selected from the group consisting of La, Ce, Pr, Nd, Pm, Sm, Eu, Gd, Tb, Dy, Ho, Er, Tm, Yb, and Lu.

The nanophosphor according to an embodiment of the present invention may be a core/multishell upconversion nanophosphor including a core provided as a nanoparticle represented by Chemical Formula 1, a first shell provided on at least a partial surface of the core and made of a compound represented by Chemical Formula 2, a second shell provided on at least a partial surface of the core and the first shell and made of a compound represented by Chemical Formula 3, a third shell provided on at least a partial surface of the core, the first shell, and the second shell and made of a compound represented by Chemical Formula 4, a fourth shell provided on at least a partial surface of the core, the first shell, the second shell, and the third shell and made of a compound represented by Chemical Formula 5, a fifth shell provided on at least a partial surface of the core, the first shell, the second shell, the third shell, and the fourth shell and made of a compound represented by Chemical Formula 6, and a sixth shell provided on at least a partial surface of the core, the first shell, the second shell, the third shell, the fourth shell, and the fifth shell and made of a compound represented by Chemical Formula 7.

An upconversion nanophosphor according to another embodiment of the present invention includes a blue-emitting nanophosphor core/crystalline shell (first intermediate layer)/green-emitting shell (first emission layer)/absorption shell (absorption layer)/crystalline shell (second intermediate layer)/red-emitting shell (second emission layer)/crystalline shell (protective layer) structure.

The upconversion nanophosphor according to another embodiment of the present invention includes a core/multi-shell upconversion nanophosphor including a blue-emitting core provided as a $Tm^{3+}$-doped fluoride nanoparticle represented by Chemical Formula 8, a crystalline shell represented by Chemical Formula 9, a green-emitting shell having a $Yb^{3+}$, $Er^{3+}$-co-doped crystalline composition represented by Chemical Formula 10, an absorption shell having a $Nd^{3+}$, $Yb^{3+}$-co-doped crystalline composition represented by Chemical Formula 11, a crystalline shell represented by Chemical Formula 12, a red-emitting shell having a $Tm^{3+}$-doped crystalline composition represented by Chemical Formula 13, and an outermost shell provided as a crystalline shell represented by Chemical Formula 14.

$$NaGd_{1-k-l-m}T_mF_4{:}Yb_l,Tm^{3+}_k \qquad \text{[Chemical Formula 8]}$$

(In Chemical Formula 8, k is a real number of 0<k<1, and more strictly, a real number of 0<k≤0.5. When k is greater than 0.5, an intensity of emission may be reduced. Herein, l is a real number of 0<l<1, m is a real number of 0≤m<1, l and m are selected within a range satisfying a condition of 0<k+l+m≤1, and T is any one selected from the group consisting of Y, La, Ce, Pr, Nd, Pm, Sm, Eu, Tb, Dy, Ho, Er, Lu, and combinations thereof.)

$$NaY_{1-c}M_cF_4 \qquad \text{[Chemical Formula 9]}$$

(In Chemical Formula 9, c is a real number of 0≤c≤1, M is any one selected from the group consisting of rare-earth elements and combinations thereof, and the rare-earth elements include any one selected from the group consisting of La, Ce, Pr, Nd, Pm, Sm, Eu, Gd, Tb, Dy, Ho, Er, Tm, Yb, and Lu.)

$$NaY_{1-d-e-f}N_fF_4{:}Yb^{3+}_d,Er^{3+}_e \qquad \text{[Chemical Formula 10]}$$

(In Chemical Formula 10, d is a real number of 0≤d≤1, and e is a real number of 0≤e≤1, and more strictly, a real number of 0≤e≤0.5. When e is greater than 0.5, an intensity of green emission may be reduced and the emission color may be changed. Herein, d and e are selected within a range satisfying a condition of 0<d+e≤1.

Herein, f is a real number of 0≤f<1 and is selected within a range satisfying a condition of 0<d+e+f≤1, N is any one selected from the group consisting of rare-earth elements and combinations thereof, and the rare-earth elements for N include any one selected from the group consisting of La, Ce, Pr, Nd, Pm, Sm, Eu, Gd, Tb, Dy, Ho, Tm, and Lu.)

$$NaLu_{1-g-h-i}Q_iF_4{:}Nd^{3+}_g,Yb^{3+}h \qquad \text{[Chemical Formula 11]}$$

(In Chemical Formula 11, g is a real number of 0<g≤1, h is a real number of 0≤h≤0.5 and is selected within a range satisfying a condition of 0<g+h≤1, i is a real number of 0≤i<1 and is selected within a range satisfying a condition of 0<g+h+i≤1, Q is any one selected from the group consisting of rare-earth elements and combinations thereof, and the rare-earth elements for Q include any one selected from the group consisting of La, Ce, Pr, Pm, Sm, Eu, Gd, Tb, Dy, Ho, Er, Tm, and Y.)

$$NaY_{1-j}R_jF_4 \qquad \text{[Chemical Formula 12]}$$

(In Chemical Formula 12, j is selected within a range satisfying a condition of a real number of 0≤j≤1, R is any one selected from the group consisting of rare-earth elements and combinations thereof, and the rare-earth elements for R include any one selected from the group consisting of La, Ce, Pr, Nd, Pm, Sm, Eu, Gd, Tb, Dy, Ho, Er, Tm, Yb, and Lu.)

$$NaEr_{1-a-b}L_bF_4{:}Tm^{3+}_a \qquad \text{[Chemical Formula 13]}$$

(In Chemical Formula 13, a is a real number of 0≤a≤0.5, b is a real number of 0≤b<1 and 0≤a+b<1 and is selected within a range satisfying a+b<1, and L is any one selected from the group consisting of Y, La, Ce, Pr, Nd, Pm, Sm, Eu, Tb, Dy, Ho, Yb, Lu, Gd, and combinations thereof.)

$$NaY_{1-m}Z_mF_4 \qquad \text{[Chemical Formula 14]}$$

(In Chemical Formula 14, m is selected within a range satisfying a condition of a real number of 0≤m≤1, Z is any one selected from the group consisting of rare-earth elements and combinations thereof, and the rare-earth elements for Z include any one selected from the group consisting of La, Ce, Pr, Nd, Pm, Sm, Eu, Gd, Tb, Dy, Ho, Er, Tm, Yb, and Lu.)

The nanoparticle may have a diameter of 1 nm to 100 nm.

The nanoparticle may have upconversion properties.

A color-tunable $NaEr_{1-a-b}L_bF_4{:}Tm^{3+}_a/NaY_{1-c}M_cF_4/NaY_{1-d-e-f}N_fF_4{:}Yb^{3+}_d,Er^{3+}_e/NaLu_{1-g-h-i}Q_iF_4{:}Nd^{3+}_g,Yb^{3+}_h/NaY_{1-j}R_jF_4/NaYb_{1-k-l}T_lF_4{:}Tm^{3+}_k/NaY_{1-m}Z_mF_4$ (where a is a real number of a 0≤a≤0.5, b is a real number of 0≤b<1 and 0≤a+b<1 and is selected within a range satisfying a+b<1, L is any one selected from the group consisting of Y, La, Ce, Pr, Nd, Pm, Sm, Eu, Tb, Dy, Ho, Yb, Lu, Gd, and combinations thereof, c is a real number of 0≤c≤1, M is any one selected from the group consisting of rare-earth elements and combinations thereof, the rare-earth elements include any one selected from the group consisting of La, Ce, Pr, Nd, Pm, Sm, Eu, Gd, Tb, Dy, Ho, Er, Tm, Yb, and Lu, d is a real number of 0≤d≤1, e is a real number of 0≤e≤1, f is a real number of 0≤f<1 and is selected within a range satisfying a condition of 0<d+e+f≤1, N is any one selected from the group consisting of rare-earth elements and combinations thereof, the rare-earth elements include any one selected from the group consisting of La, Ce, Pr, Nd, Pm, Sm, Eu, Gd, Tb, Dy, Ho, Tm, and Lu, g is a real number of 0<g≤1, h is a real number of 0≤h≤0.5 and is selected within a range satisfying a condition of 0<g+h≤1, i is a real number of 0≤i<1 and is selected within a range satisfying a condition of 0<g+h+i≤1, Q is any one selected from the group consisting of rare-earth elements and combinations thereof, the rare-earth elements include any one selected from the group consisting of La, Ce, Pr, Pm, Sm, Eu, Gd, Tb, Dy, Ho, Er, Tm, and Y, j is selected within a range satisfying a condition of a real number of $0 \le j \le 1$, R is any one selected from the group consisting of rare-earth elements and combinations thereof, the rare-earth elements include any one selected from the group consisting of La, Ce, Pr, Nd, Pm, Sm, Eu, Gd, Tb, Dy, Ho, Er, Tm, Yb, and Lu, k is a real number of $0 < k < 1$, l is a real number of $0 \le l < 1$ and is selected within a range satisfying a condition of $0 < k+l < 1$, T is any one selected from the group consisting of rare-earth elements and combinations thereof, the rare-earth elements include any one selected from the group consisting of Y, La, Ce, Pr, Nd, Pm, Sm, Eu, Gd, Tb, Dy, Ho, Er, and Lu, m is selected within a range satisfying a condition of a real number of $0 \le m \le 1$, Z is any one selected from the group consisting of rare-earth elements and combinations thereof, and the rare-earth elements include any one selected from the group consisting of La, Ce, Pr, Nd, Pm, Sm, Eu, Gd, Tb, Dy, Ho, Er, Tm, Yb, and Lu) upconversion nanophosphor having a core/shell/shell/shell/shell/shell/shell structure, according to embodiments of the present invention, will now be described with reference to the attached drawings.

Referring to FIG. 1, a red-emitting nanophosphor core/crystalline shell (first intermediate layer)/green-emitting shell (first emission layer)/absorption layer cell (absorption layer)/crystalline shell (second intermediate layer)/blue-emitting shell (second emission layer)/crystalline shell (protective layer)⊇| structure, or blue-emitting core/crystalline shell (first intermediate layer)/green-emitting shell (first emission layer)/absorption shell (absorption layer)/crystalline shell (second intermediate layer)/red-emitting shell (second emission layer)/crystalline shell (protective layer) upconversion nanophosphor will be described. The scope of the present invention is not limited to the disclosed embodiments, and other embodiments may be easily proposed by adding or replacing constituent elements.

However, the present invention should not be construed as being limited to the embodiments described above and illustrated in the drawings; rather, these embodiments are provided so that this disclosure will be thorough and complete.

A method of synthesizing a full-color tunable fluoride core/shell/shell/shell/shell/shell/shell upconversion nanophosphor, according to embodiments of the present invention, will now be described in detail.

<Embodiment 1> Synthesis of Core Upconversion Nanophosphor Doped with 0.995 Mmol of $Er^{3+}$ and 0.005 Mmol of $Tm^{3+}$ In Embodiment 1, $NaErF_4:Tm^{3+}$ nanoparticles were synthesized. The $NaErF_4:Tm^{3+}$ nanoparticles synthesized in Embodiment 1 may be understood as, for example, $NaEr_{0.995}F_4:Tm^{3+}_{0.005}$ nanoparticles, and the $Tm^{3+}$-doped fluoride nanoparticles may be red-emitting cores represented by Chemical Formula 1. Initially, 0.995 mmol of erbium chloride hydrate ($ErCl_3.6H_2O$) and 0.005 mmol of thulium chloride hydrate ($TmCl_3.6H_2O$) were mixed with a solution including oleic acid and 1-octadecene and heat treatment was performed at 150° C. for 30 minutes to prepare a mixture solution including a lanthanide complex (first mixture solution preparation step).

10 ml of a methanol solution including 2.5 mmol of sodium hydroxide and 4 mmol of ammonium fluoride was prepared (second mixture solution preparation step) and then was mixed with the first mixture solution (reaction solution preparation step).

12

Figure 2:
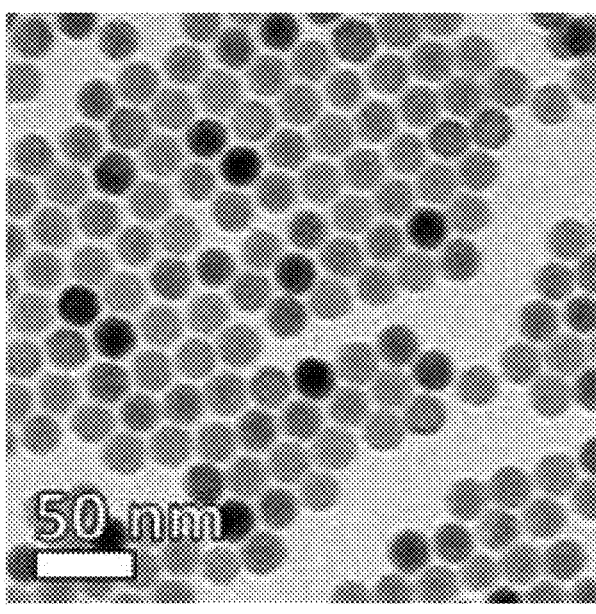
FIG. 2 is a transmission electron microscope (TEM) image of core nanoparticles according to an embodiment of the present invention.

After sufficiently mixed, methanol was removed and then heat treatment was performed in an inert gas atmosphere. In this case, when the heat treatment was performed at a temperature lower than 200° C., single-phase hexagonal nanocrystals might not be completely formed and thus the phosphor might not exhibit strong emission. When the heat treatment was performed at a temperature higher than 370° C., aggregation of particles due to overreaction might cause very large and non-uniform particle diameters and thus brightness might be reduced. Therefore, the heat treatment would be performed at a temperature of 200° C. to 370° C. for 10 minutes to 4 hours (nanoparticle formation step). After the heat treatment was finished and a cooling process was performed to a room temperature, a colloidal nanophosphor having a diameter of 1 nm to 30 nm was obtained. The nanophosphor obtained as described above was washed with acetone or ethanol and then was dispersed and stored in a non-polar solvent such as hexane, toluene, or chloroform. FIG. 2 is a transmission electron microscope (TEM) image of the upconversion nanophosphor synthesized in Embodiment 1, and it is shown that a core nanophosphor having a uniform diameter of about 22 nm is synthesized.

<Embodiment 2> Synthesis of Core/Shell Upconversion Nanophosphor Through Formation of Fluoride Shell In Embodiment 2, a core/shell ($NaErF_4:Tm^{3+}/NaYF_4$) nanophosphor using, as cores, the $NaErF_4:Tm^{3+}$ nanoparticles synthesized in Embodiment 1, and including a fluoride compound was synthesized. The shells synthesized in Embodiment 2 may be crystalline shells represented by Chemical Formula 2. Initially, 1 mmol of yttrium chloride hydrate ($YCl_3.6H_2O$) was mixed with a solution including oleic acid and 1-octadecene and heat treatment was performed at 150° C. for 30 minutes to prepare a mixture solution including a lanthanide complex (first mixture solution preparation step).

A second mixture solution was prepared by mixing the first mixture solution with the solution including the $NaErF_4:Tm^{3+}$ nanoparticles synthesized in Embodiment 1.

10 ml of a methanol solution including 2.5 mmol of sodium hydroxide and 4 mmol of ammonium fluoride was prepared (third mixture solution preparation step) and then was mixed with the mixture solution including the lanthanide complex (reaction solution preparation step).

After sufficiently mixed, methanol was removed and then heat treatment was performed in an inert gas atmosphere. In this case, when the heat treatment was performed at a temperature lower than 200° C., single-phase hexagonal nanocrystals might not be completely formed and thus the phosphor might not exhibit strong emission. When the heat treatment was performed at a temperature higher than 370° C., aggregation of particles due to overreaction might cause very large and non-uniform particle diameters and thus brightness might be reduced. Therefore, the heat treatment would be performed at a temperature of 200° C. to 370° C. for 10 minutes to 4 hours (nanoparticle formation step). After the heat treatment was finished and a cooling process was performed to a room temperature, a colloidal nanophosphor having a diameter of 1 nm to 35 nm was obtained. The nanophosphor obtained as described above was washed with acetone or ethanol and then was dispersed and stored in a non-polar solvent such as hexane, toluene, or chloroform.

Figure 3:
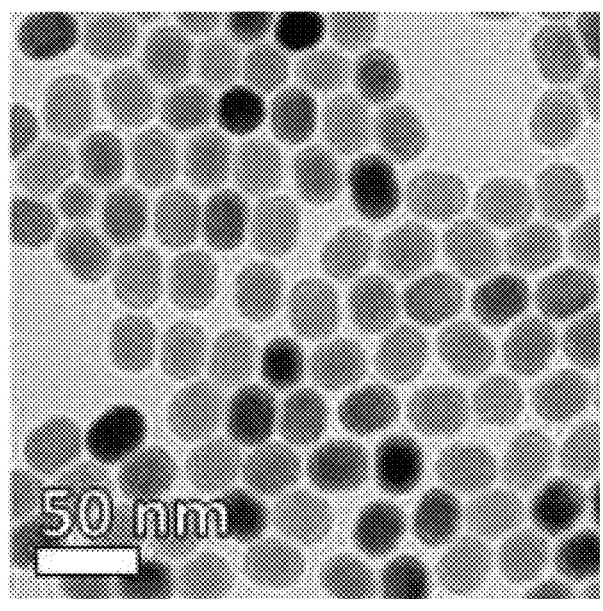
FIG. 3 is a TEM image of core/shell nanoparticles according to an embodiment of the present invention.

FIG. 3 is a TEM image of the core/shell upconversion nanophosphor synthesized in Embodiment 2, and it is shown that a core/shell nanophosphor having a uniform diameter of about 33 nm is synthesized.

<Embodiment 3> Synthesis of Core/Shell/Shell Upconversion Nanophosphor In Embodiment 3, a core/shell/shell nanophosphor using, as cores, the $NaErF_4:Tm^{3+}/NaYF_4$ nanoparticles synthesized in Embodiment 2, and including a $NaYF_4:Yb^{3+}$ compound was synthesized. The $NaYF_4:Yb^{3+}$ compound synthesized in Embodiment 3 may be understood as, for example, a $NaY_{0.75}F_4:Yb^{3+}_{0.25}$ compound. The shells including the $NaYF_4:Yb^{3+}$ compound synthesized in Embodiment 3 may be green-emitting shells (first emission layers) represented by Chemical Formula 3.

0.75 mmol of yttrium chloride hydrate ($YCl_3.6H_2O$) and 0.25 mmol of ytterbium chloride hydrate ($YbCl_3.6H_2O$) were mixed with a solution including oleic acid and 1-octadecene and heat treatment was performed at 150° C. for 30 minutes to prepare a mixture solution including a lanthanide complex (first mixture solution preparation step).

A second mixture solution was prepared by mixing the first mixture solution with the solution including the $NaErF_4:Tm^{3+}/NaYF_4$ nanoparticles synthesized in Embodiment 2.

10 ml of a methanol solution including 2.5 mmol of sodium hydroxide and 4 mmol of ammonium fluoride was prepared (third mixture solution preparation step) and then was mixed with the mixture solution including the lanthanide complex (reaction solution preparation step).

After sufficiently mixed, methanol was removed and then heat treatment was performed in an inert gas atmosphere. In this case, when the heat treatment was performed at a temperature lower than 200° C., single-phase hexagonal nanocrystals might not be completely formed and thus the phosphor might not exhibit strong emission. When the heat treatment was performed at a temperature higher than 370° C., aggregation of particles due to overreaction might cause very large and non-uniform particle diameters and thus brightness might be reduced. Therefore, the heat treatment would be performed at a temperature of 200° C. to 370° C. for 10 minutes to 4 hours (nanoparticle formation step). After the heat treatment was finished and a cooling process was performed to a room temperature, a colloidal nanophosphor having a diameter of 1 nm to 45 nm was obtained. The nanophosphor obtained as described above was washed with acetone or ethanol and then was dispersed and stored in a non-polar solvent such as hexane, toluene, or chloroform.

Figure 4:
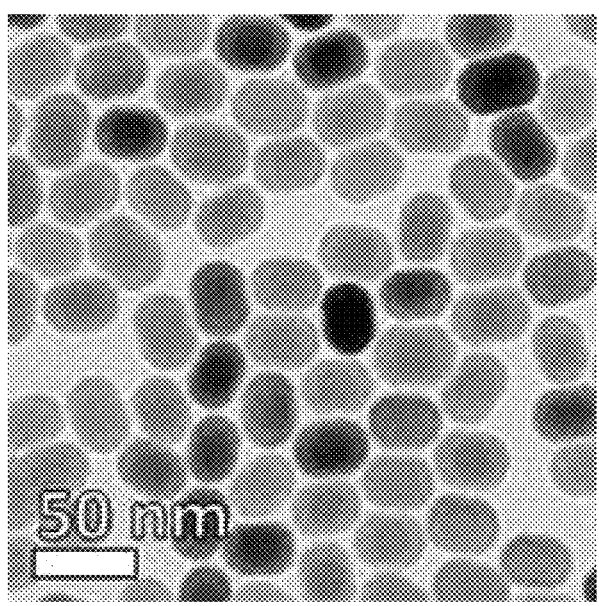
FIG. 4 is a TEM image of core/shell/shell nanoparticles according to an embodiment of the present invention.

FIG. 4 is a TEM image of the core/shell/shell upconversion nanophosphor synthesized in Embodiment 3 of the present invention. The TEM image shows that a particle diameter is additionally increased due to the formation of the shell around the core/shell structure.

<Embodiment 4> Synthesis of Core/Shell/Shell/Shell Upconversion Nanophosphor In Embodiment 4, a core/shell/shell/shell nanophosphor using, as cores, the $NaErF_4:Tm^{3+}/NaYF_4/NaYF_4:Yb^{3+}$ nanoparticles synthesized in Embodiment 3, and including a $NaLuF_4:Nd^{3+},Yb^{3+}$ compound was synthesized. The $NaLuF_4:Nd^{3+},Yb^{3+}$ compound synthesized in Embodiment 4 may be understood as, for example, a $NaLu_{0.3}F_4:Nd^{3+}_{0.6},Yb^{3+}_{0.1}$ compound. The shells including the $NaLuF_4:Nd^{3+},$ $Yb^{3+}$ compound synthesized in Embodiment 4 may be absorption shells (absorption layers) represented by Chemical Formula 4.

0.18 mmol of lutetium chloride hydrate ($LuCl_3.6H_2O$), 0.36 mmol of neodymium chloride hydrate ($NdCl_3.6H_2O$), and 0.06 mmol of ytterbium chloride hydrate ($YbCl_3.6H_2O$) were mixed with a solution including oleic acid and 1-octadecene and heat treatment was performed at 150° C. for 30 minutes to prepare a mixture solution including a lanthanide complex (first mixture solution preparation step).

A second mixture solution was prepared by mixing the first mixture solution with the solution including the $NaErF_4:Tm^{3+}/NaYF_4/NaYF_4:Yb^{3+}$ nanoparticles synthesized in Embodiment 3.

6 ml of a methanol solution including 1.5 mmol of sodium hydroxide and 2.4 mmol of ammonium fluoride was prepared (third mixture solution preparation step) and then was mixed with the mixture solution including the lanthanide complex (reaction solution preparation step).

After sufficiently mixed, methanol was removed and then heat treatment was performed in an inert gas atmosphere. In this case, when the heat treatment was performed at a temperature lower than 200° C., single-phase hexagonal nanocrystals might not be completely formed and thus the phosphor might not exhibit strong emission. When the heat treatment was performed at a temperature higher than 370° C., aggregation of particles due to overreaction might cause very large and non-uniform particle diameters and thus brightness might be reduced. Therefore, the heat treatment would be performed at a temperature of 200° C. to 370° C. for 10 minutes to 4 hours (nanoparticle formation step). After the heat treatment was finished and a cooling process was performed to a room temperature, a colloidal nanophosphor having a diameter of 1 nm to 50 nm was obtained. The nanophosphor obtained as described above was washed with acetone or ethanol and then was dispersed and stored in a non-polar solvent such as hexane, toluene, or chloroform.

Figure 5:
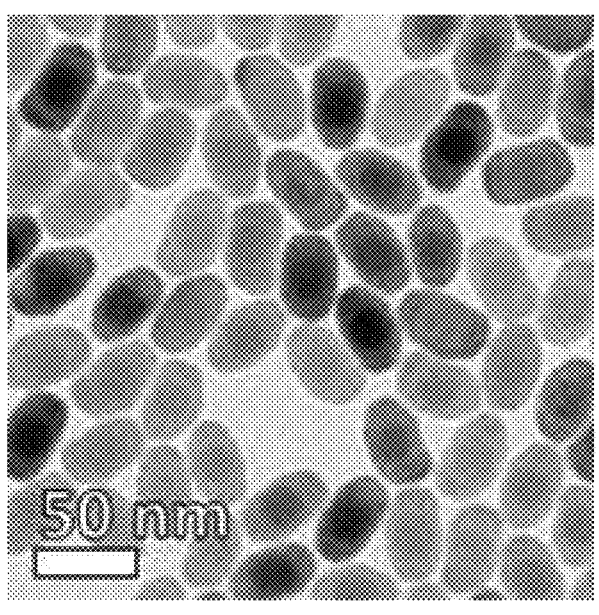
FIG. 5 is a TEM image of core/shell/shell/shell nanoparticles according to an embodiment of the present invention.

FIG. 5 is a TEM image of the core/shell/shell/shell upconversion nanophosphor synthesized in Embodiment 4 of the present invention. The TEM image shows that a particle diameter is additionally increased due to the formation of the shell around the core/shell/shell structure.

<Embodiment 5> Synthesis of Core/Shell/Shell/Shell/Shell Upconversion Nanophosphor In Embodiment 5, a core/shell/shell/shell/shell nanophosphor using, as cores, the $NaErF_4:Tm^{3+}/NaYF_4/NaYF_4:Yb^{3+}/NaLuF_4:Nd^{3+},Yb^{3+}$ nanoparticles synthesized in Embodiment 4, and including a $NaYF_4$ compound was synthesized. The shells including the $NaYF_4$ compound synthesized in Embodiment 5 may be crystalline shells (second intermediate layers) represented by Chemical Formula 5.

2.5 mmol of yttrium chloride hydrate ($YCl_3.6H_2O$) was mixed with a solution including oleic acid and 1-octadecene and heat treatment was performed at 150° C. for 30 minutes to prepare a mixture solution including a lanthanide complex (first mixture solution preparation step).

A second mixture solution was prepared by mixing the first mixture solution with the solution including the $NaErF_4:Tm^{3+}/NaYF_4/NaYF_4:Yb^{3+}/NaLuF_4:$ $Nd^{3+},Yb^{3+}$ nanoparticles synthesized in Embodiment 4.

25 ml of a methanol solution including 6.25 mmol of sodium hydroxide and 10 mmol of ammonium fluoride was prepared (third mixture solution preparation step) and then was mixed with the mixture solution including the lanthanide complex (reaction solution preparation step).

After sufficiently mixed, methanol was removed and then heat treatment was performed in an inert gas atmosphere. In this case, when the heat treatment was performed at a temperature lower than 200° C., single-phase hexagonal nanocrystals might not be completely formed and thus the phosphor might not exhibit strong emission. When the heat treatment was performed at a temperature higher than 370° C., aggregation of particles due to overreaction might cause very large and non-uniform particle diameters and thus brightness might be reduced. Therefore, the heat treatment would be performed at a temperature of 200° C. to 370° C. for 10 minutes to 4 hours (nanoparticle formation step). After the heat treatment was finished and a cooling process was performed to a room temperature, a colloidal nanophosphor having a diameter of 1 nm to 60 nm was obtained. The nanophosphor obtained as described above was washed with acetone or ethanol and then was dispersed and stored in a non-polar solvent such as hexane, toluene, or chloroform.

Figure 6:
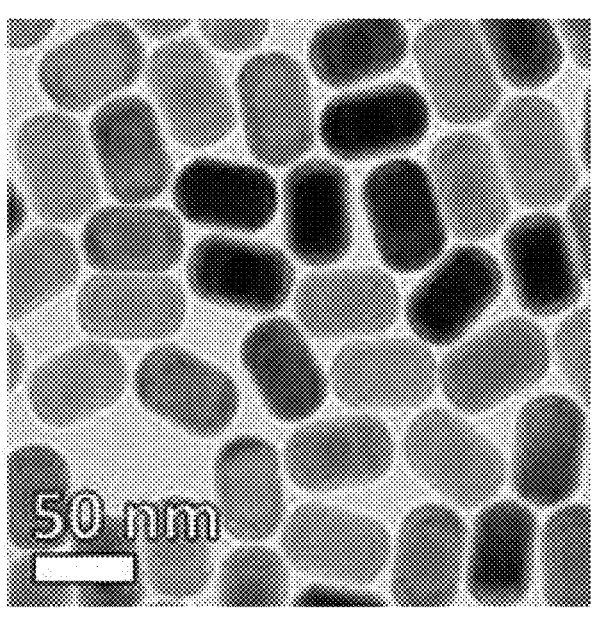
FIG. 6 is a TEM image of core/shell/shell/shell/shell nanoparticles according to an embodiment of the present invention.

FIG. 6 is a TEM image of the core/shell/shell/shell/shell upconversion nanophosphor synthesized in Embodiment 5 of the present invention. The TEM image shows that a particle diameter is additionally increased due to the formation of the shell around the core/shell/shell/shell structure.

<Embodiment 6> Synthesis of Core/Shell/Shell/Shell/Shell/Shell Upconversion Nanophosphor In Embodiment 6, a core/shell/shell/shell/shell/shell nanophosphor using, as cores, the $NaErF_4:Tm^{3+}/NaYF_4/NaYF_4:Yb^{3+}/NaLuF_4:Nd^{3+},Yb^{3+}/NaYF_4$ nanoparticles synthesized in Embodiment 5, and including a $NaYbF_4:Tm^{3+}$ compound was synthesized. The $NaYbF_4:Tm^{3+}$ nanoparticles synthesized in Embodiment 6 may be understood as, for example, $NaYb_{0.99}F_4:Tm^{3+}_{0.01}$ nanoparticles. The shells including the $NaYbF_4:Tm^{3+}$ compound synthesized in Embodiment 6 may be blue-emitting shells (second emission layers) represented by Chemical Formula 6.

2.97 mmol of ytterbium chloride hydrate ($YbCl_3.6H_2O$) and 0.03 mmol of thulium chloride hydrate ($TmCl_3.6H_2O$) were mixed with a solution including oleic acid and 1-octadecene and heat treatment was performed at 150° C. for 30 minutes to prepare a mixture solution including a lanthanide complex (first mixture solution preparation step).

A second mixture solution was prepared by mixing the first mixture solution with the solution including the $NaErF_4:Tm^{3+}/NaYF_4/NaYF_4:Yb^{3+}/NaLuF_4:Nd^{3+},Yb^{3+}/NaYF_4$ nanoparticles synthesized in Embodiment 5.

30 ml of a methanol solution including 7.5 mmol of sodium hydroxide and 12 mmol of ammonium fluoride was prepared (third mixture solution preparation step) and then was mixed with the mixture solution including the lanthanide complex (reaction solution preparation step).

After sufficiently mixed, methanol was removed and then heat treatment was performed in an inert gas atmosphere. In this case, when the heat treatment was performed at a temperature lower than 200° C., single-phase hexagonal nanocrystals might not be completely formed and thus the phosphor might not exhibit strong emission. When the heat treatment was performed at a temperature higher than 370° C., aggregation of particles due to overreaction might cause very large and non-uniform particle diameters and thus brightness might be reduced. Therefore, the heat treatment would be performed at a temperature of 200° C. to 370° C. for 10 minutes to 4 hours (nanoparticle formation step).

After the heat treatment was finished and a cooling process was performed to a room temperature, a colloidal nanophosphor having a diameter of 1 nm to 70 nm was obtained. The nanophosphor obtained as described above was washed with acetone or ethanol and then was dispersed and stored in a non-polar solvent such as hexane, toluene, or chloroform.

Figure 7:
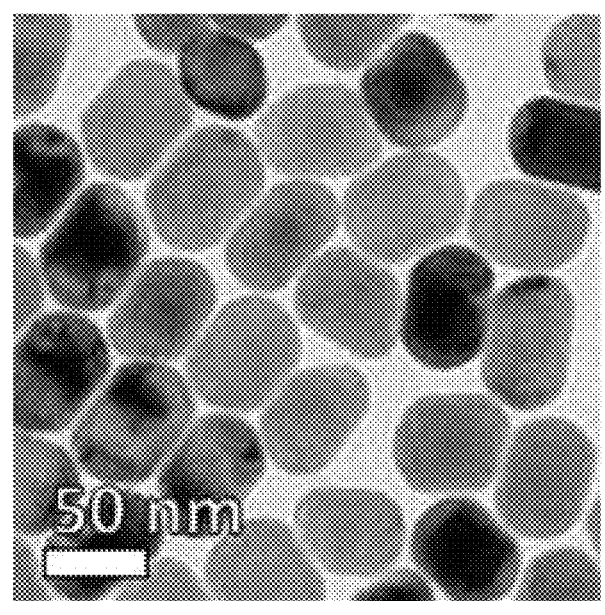
FIG. 7 is a TEM image of core/shell/shell/shell/shell/shell nanoparticles according to an embodiment of the present invention.

FIG. 7 is a TEM image of the core/shell/shell/shell/shell/shell upconversion nanophosphor synthesized in Embodiment 6 of the present invention. The TEM image shows that a particle diameter is additionally increased due to the formation of the shell around the core/shell/shell/shell/shell structure.

<Embodiment 7> Synthesis of Core/Shell/Shell/Shell/Shell/Shell/Shell Upconversion Nanophosphor In Embodiment 7, a core/shell/shell/shell/shell/shell/shell nanophosphor using, as cores, the $NaErF_4:Tm^{3+}/NaYF_4/NaYF_4:Yb^{3+}/NaLuF_4:$ $Nd^{3+},Yb^{3+}/NaYF_4/NaYbF_4:Tm^{3+}$ nanoparticles synthesized in Embodiment 6, and including a $NaYF_4$ compound was synthesized. The shells including the $NaYF_4$ compound synthesized in Embodiment 7 may be crystalline shells (protective layers) represented by Chemical Formula 7.

1 mmol of yttrium chloride hydrate ($YCl_3.6H_2O$) was mixed with a solution including oleic acid and 1-octadecene and heat treatment was performed at 150° C. for 30 minutes to prepare a mixture solution including a lanthanide complex (first mixture solution preparation step).

A second mixture solution was prepared by mixing the first mixture solution with the solution including the $NaErF_4:Tm^{3+}/NaYF_4/NaYF_4:Yb^{3+}/NaLuF_4:Nd^{3+},Yb^{3+}/NaYF_4/NaYbF_4:Tm^{3+}$ nanoparticles synthesized in Embodiment 6.

10 ml of a methanol solution including 2.5 mmol of sodium hydroxide and 4 mmol of ammonium fluoride was prepared (third mixture solution preparation step) and then was mixed with the mixture solution including the lanthanide complex (reaction solution preparation step).

After sufficiently mixed, methanol was removed and then heat treatment was performed in an inert gas atmosphere. In this case, when the heat treatment was performed at a temperature lower than 200° C., single-phase hexagonal nanocrystals might not be completely formed and thus the phosphor might not exhibit strong emission. When the heat treatment was performed at a temperature higher than 370° C., aggregation of particles due to overreaction might cause very large and non-uniform particle diameters and thus brightness might be reduced. Therefore, the heat treatment would be performed at a temperature of 200° C. to 370° C. for 10 minutes to 4 hours (nanoparticle formation step). After the heat treatment was finished and a cooling process was performed to a room temperature, a colloidal nanophosphor having a diameter of 1 nm to 80 nm was obtained. The nanophosphor obtained as described above was washed with acetone or ethanol and then was dispersed and stored in a non-polar solvent such as hexane, toluene, or chloroform.

Figure 8:
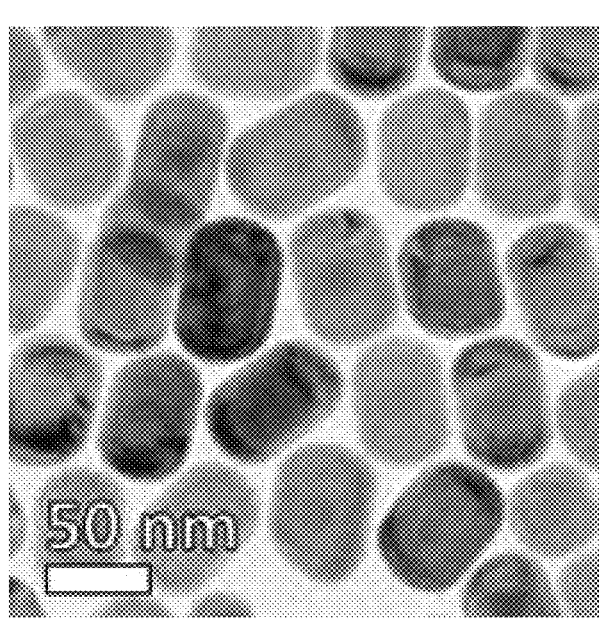
FIG. 8 is a TEM image of core/shell/shell/shell/shell/shell/shell nanoparticles according to an embodiment of the present invention.

FIG. 8 is a TEM image of the core/shell/shell/shell/shell/shell/shell upconversion nanophosphor synthesized in Embodiment 7 of the present invention. The TEM image shows that a particle diameter is additionally increased due to the formation of the shell around the core/shell/shell/shell/shell/shell structure.

Figure 9:
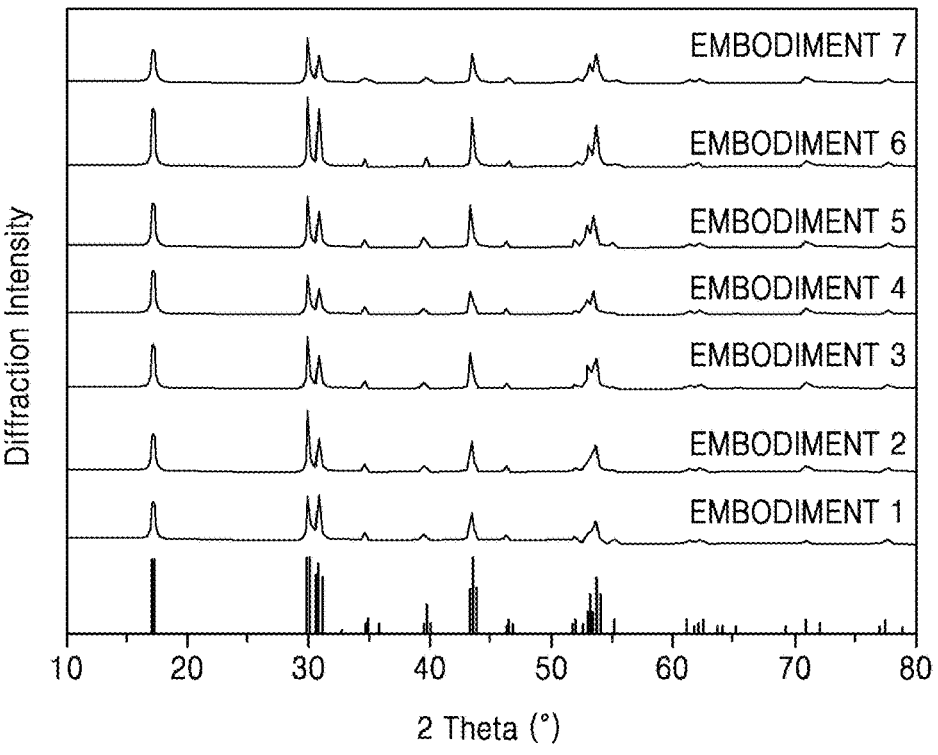
FIG. 9 is a graph showing X-ray diffraction patterns of core to core/shell/shell/shell/shell/shell/shell nanoparticles according to embodiments of the present invention.
Figure 10:
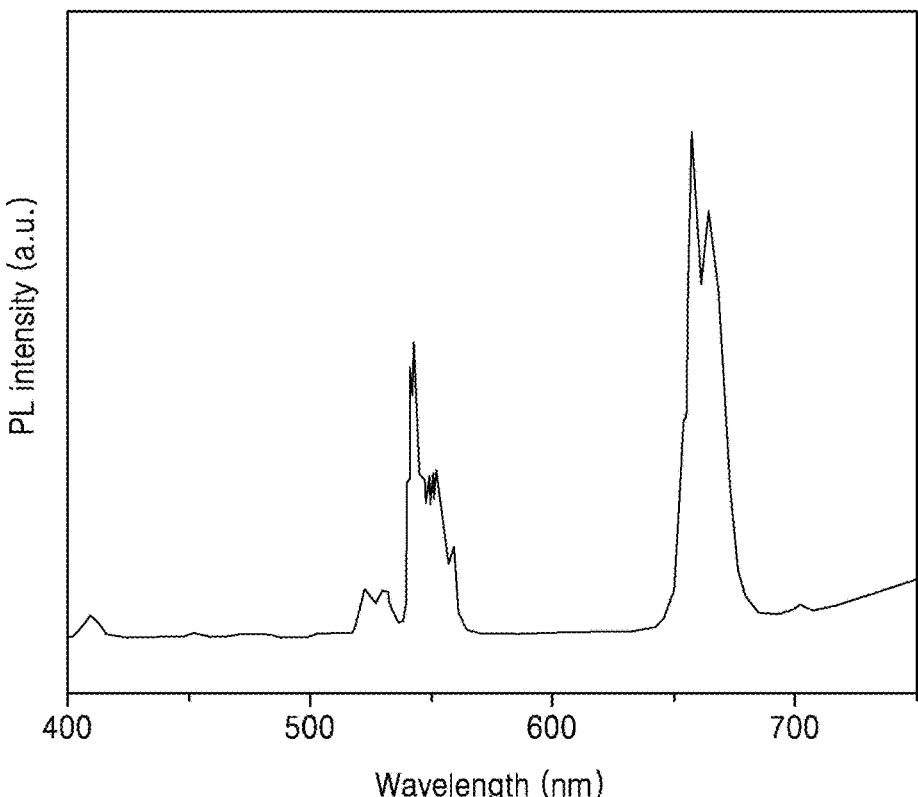
FIG. 10 is a graph showing a photoluminescence (PL) spectrum of core/shell/shell/shell/shell/shell/shell nanoparticles according to an embodiment of the present invention under a 800 nm near-infrared (NIR) excitation condition.
Figure 11:
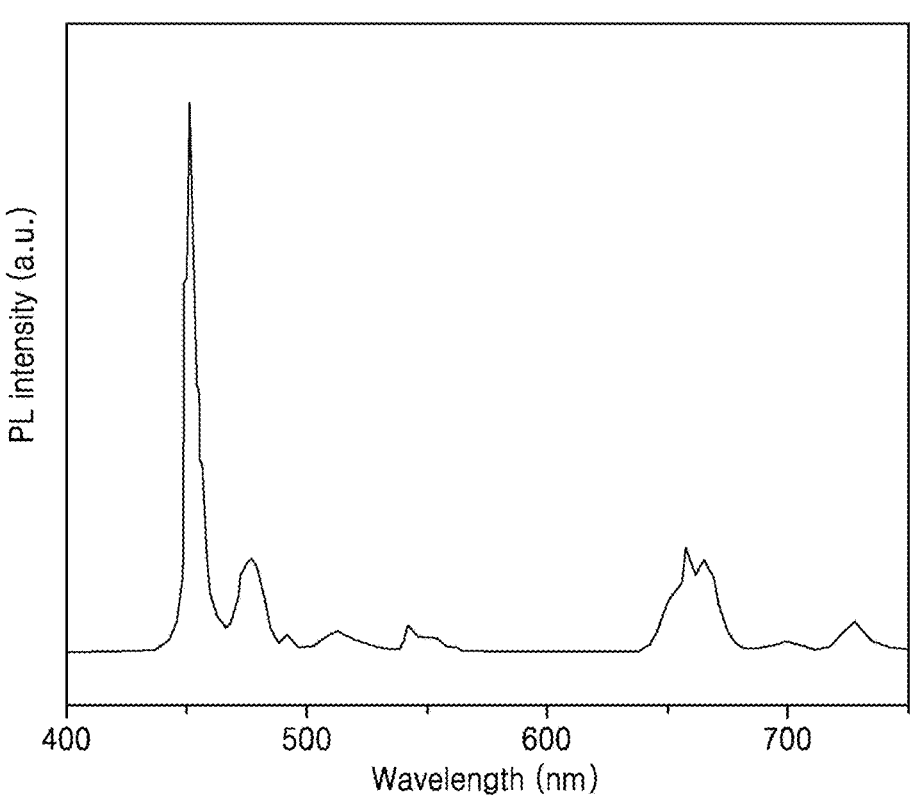
FIG. 11 is a graph showing a PL spectrum of core/shell/shell/shell/shell/shell/shell nanoparticles according to an embodiment of the present invention under a 980 nm NIR excitation condition.
Figure 12:
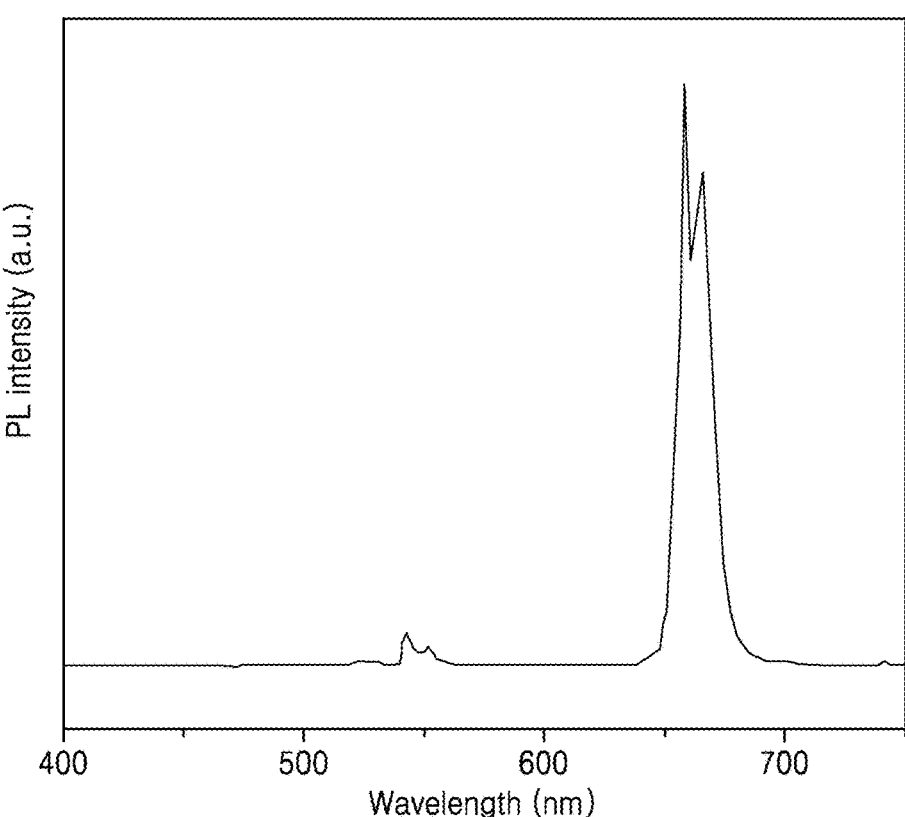
FIG. 12 is a graph showing a PL spectrum of core/shell/shell/shell/shell/shell/shell nanoparticles according to an embodiment of the present invention under a 1532 nm NIR excitation condition.

X-ray diffraction patterns of FIG. 9 show that the upconversion nanophosphors synthesized in Embodiments 1 to 7 exhibit a single-phase hexagonal structure without impurities. Photoluminescence (PL) spectra of FIGS. 10 to 12 show that the core/shell/shell/shell/shell/shell/shell upconversion nanophosphor synthesized in Embodiment 7 emits green light (see FIG. 10) under 800 nm near-infrared (NIR) excitation, emits blue light (see FIG. 11) under 980 nm NIR excitation, and emits red light (see FIG. 12) under 1532 nm NIR excitation.

Figure 13:
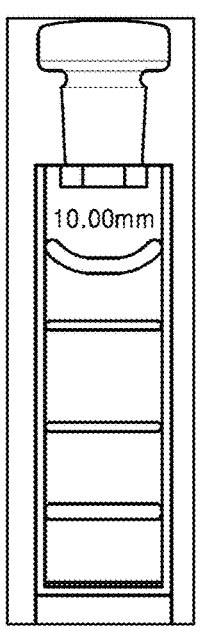
FIG. 13 is a luminescence image of core/shell/shell/shell/shell/shell/shell nanoparticles according to an embodiment of the present invention under 800 nm, 980 nm, and 1532 nm NIR excitation conditions.
Figure 14:
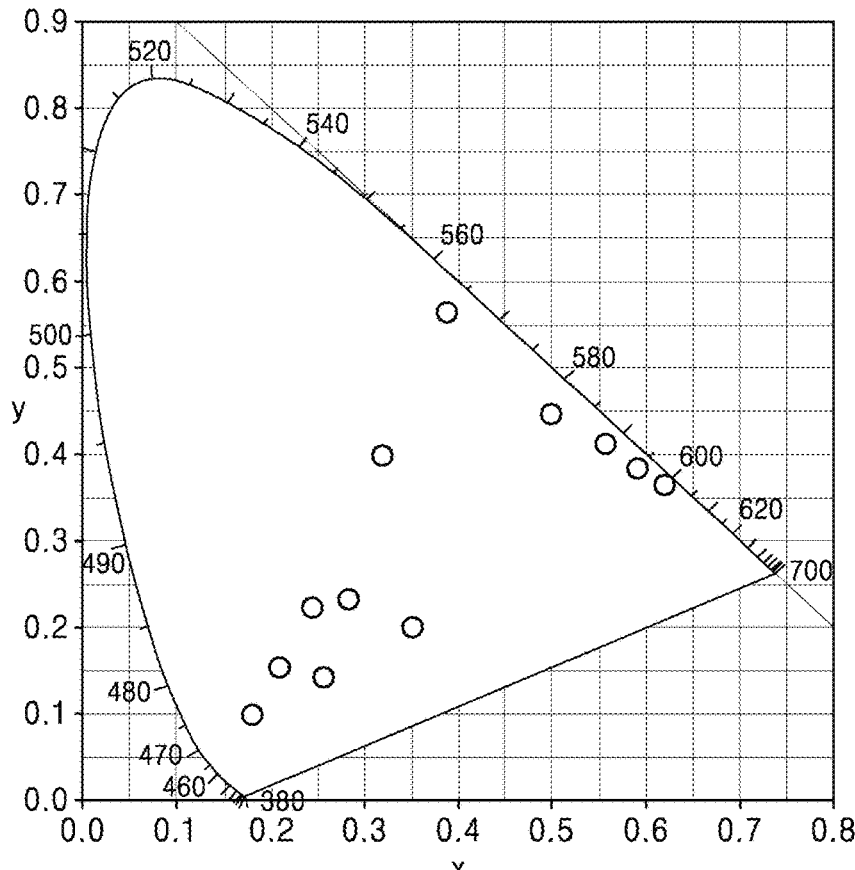
FIG. 14 is a chromaticity diagram showing color coordinates of core/shell/shell/shell/shell/shell/shell nanoparticles according to an embodiment of the present invention under various NIR excitation conditions.

A luminescence image of FIG. 13 shows that the core/shell/shell/shell/shell/shell/shell upconversion nanophosphor synthesized in Embodiment 7 may simultaneously emit blue, green, and red, and a chromaticity diagram of FIG. 14 shows that the core/shell/shell/shell/shell/shell/shell upconversion nanophosphor emits various colors such as blue, blue-green, green, yellow, purple, and red when NIR excitation wavelengths are combined.

<Embodiment 8> Synthesis of Core/Shell/Shell Upconversion Nanophosphor

In Embodiment 8, a core/shell/shell nanophosphor using, as cores, the $NaErF_4:Tm^{3+}/NaYF_4$ nanoparticles synthesized in Embodiment 2, and including a $NaYF_4:Yb^{3+},Er^{3+}$ compound was synthesized. The $NaYF_4:Yb^{3+},Er^{3+}$ nanoparticles synthesized in Embodiment 8 may be understood as, for example, $NaY_{0.8}F_4:Yb^{3+}_{0.18},Er^{3+}_{0.02}$ nanoparticles. The $NaErF_4:Tm^{3+}$ nanoparticles synthesized in Embodiment 2 may be red-emitting cores represented by Chemical Formula 1, and the $NaYF_4$ shells may be crystalline shells represented by Chemical Formula 2. Furthermore, the shells including the $NaYF_4:Yb^{3+},Er^{3+}$ compound synthesized in Embodiment 8 may be green-emitting shells (first emission layers) represented by Chemical Formula 3.

0.8 mmol of yttrium chloride hydrate ($YCl_3.6H_2O$), 0.18 mmol of ytterbium chloride hydrate ($YbCl_3.6H_2O$), and 0.02 mmol of erbium chloride hydrate ($ErCl_3.6H_2O$) were mixed with a solution including oleic acid and 1-octadecene and heat treatment was performed at 150° C. for 30 minutes to prepare a mixture solution including a lanthanide complex (first mixture solution preparation step).

A second mixture solution was prepared by mixing the first mixture solution with the solution including the $NaErF_4:Tm^{3+}/NaYF$ nanoparticles synthesized in Embodiment 2.

10 ml of a methanol solution including 2.5 mmol of sodium hydroxide and 4 mmol of ammonium fluoride was prepared (third mixture solution preparation step) and then was mixed with the mixture solution including the lanthanide complex (reaction solution preparation step).

After sufficiently mixed, methanol was removed and then heat treatment was performed in an inert gas atmosphere. In this case, when the heat treatment was performed at a temperature lower than 200° C., single-phase hexagonal nanocrystals might not be completely formed and thus the phosphor might not exhibit strong emission. When the heat treatment was performed at a temperature higher than 370° C., aggregation of particles due to overreaction might cause very large and non-uniform particle diameters and thus brightness might be reduced. Therefore, the heat treatment would be performed at a temperature of 200° C. to 370° C. for 10 minutes to 4 hours (nanoparticle formation step). After the heat treatment was finished and a cooling process was performed to a room temperature, a colloidal nanophosphor having a diameter of 1 nm to 45 nm was obtained. The nanophosphor obtained as described above was washed with acetone or ethanol and then was dispersed and stored in a non-polar solvent such as hexane, toluene, or chloroform.

Figure 15:
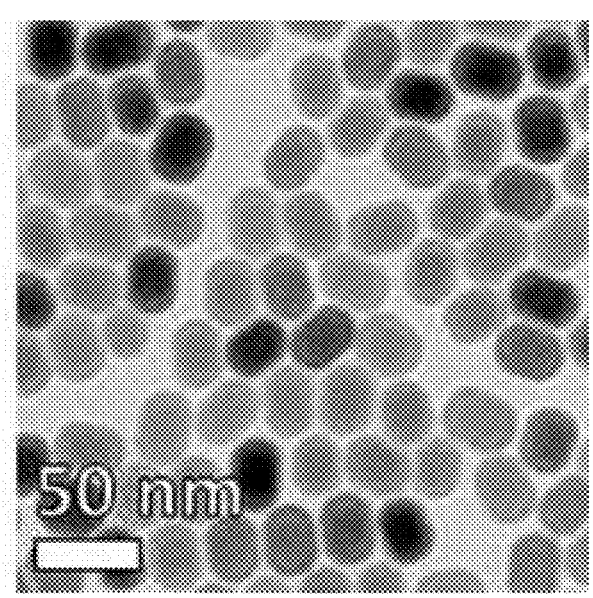
FIG. 15 is a TEM image of core/shell/shell nanoparticles according to an embodiment of the present invention.

FIG. 15 is a TEM image of the core/shell/shell upconversion nanophosphor synthesized in Embodiment 8 of the present invention. The TEM image shows that a particle diameter is additionally increased due to the formation of the shell around the core/shell structure.

<Embodiment 9> Synthesis of Core/Shell/Shell/Shell Upconversion Nanophosphor In Embodiment 9, a core/shell/shell/shell nanophosphor using, as cores, the $NaErF_4:Tm^{3+}/NaYF/NaYF_4:Yb^{3+},Er^{3+}$ nanoparticles synthesized in Embodiment 8, and including a $NaYF_4:Nd^{3+},Yb^{3+}$ compound was synthesized. The $NaYF_4:Nd^{3+},Yb^{3+}$ compound synthesized in Embodiment 9 may be understood as, for example, a $NaY_{0.3}F_4:Nd^{3+}_{0.6},Yb^{3+}_{0.1}$ compound. The shells including the $NaYF_4:Nd^{3+},Yb^{3+}$ compound synthesized in Embodiment 9 may be absorption shells (absorption layers) represented by Chemical Formula 4.

0.12 mmol of yttrium chloride hydrate ($YCl_3.6H_2O$), 0.24 mmol of neodymium chloride hydrate ($NdCl_3.6H_2O$), and 0.04 mmol of ytterbium chloride hydrate ($YbCl_3.6H_2O$) were mixed with a solution including oleic acid and 1-octadecene and heat treatment was performed at 150° C. for 30 minutes to prepare a mixture solution including a lanthanide complex (first mixture solution preparation step).

A second mixture solution was prepared by mixing the first mixture solution with the solution including the $NaEr_{0.995}F_4:Tm^{3+}_{0.005}/NaYF/NaYF_4:Yb^{3+},Er^{3+}$ nanoparticles synthesized in Embodiment 8.

4 ml of a methanol solution including 1 mmol of sodium hydroxide and 1.6 mmol of ammonium fluoride was prepared (third mixture solution preparation step) and then was mixed with the mixture solution including the lanthanide complex (reaction solution preparation step).

After sufficiently mixed, methanol was removed and then heat treatment was performed in an inert gas atmosphere. In this case, when the heat treatment was performed at a temperature lower than 200° C., single-phase hexagonal nanocrystals might not be completely formed and thus the phosphor might not exhibit strong emission. When the heat treatment was performed at a temperature higher than 370° C., aggregation of particles due to overreaction might cause very large and non-uniform particle diameters and thus brightness might be reduced. Therefore, the heat treatment would be performed at a temperature of 200° C. to 370° C. for 10 minutes to 4 hours (nanoparticle formation step). After the heat treatment was finished and a cooling process was performed to a room temperature, a colloidal nanophosphor having a diameter of 1 nm to 50 nm was obtained. The nanophosphor obtained as described above was washed with acetone or ethanol and then was dispersed and stored in a non-polar solvent such as hexane, toluene, or chloroform.

Figure 16:
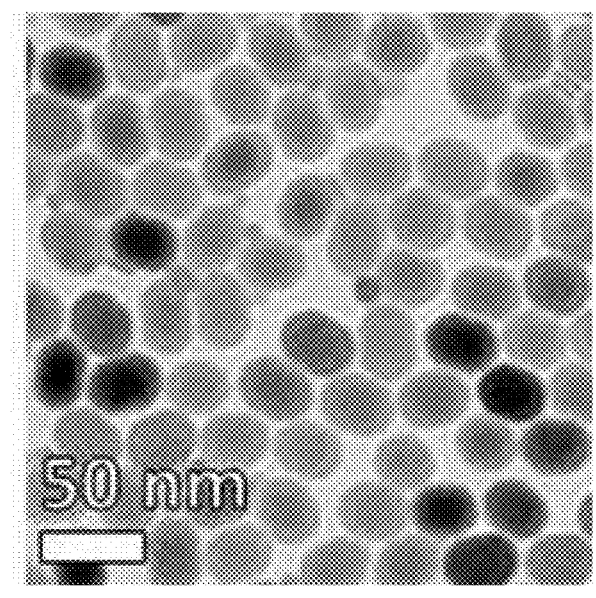
FIG. 16 is a TEM image of core/shell/shell/shell nanoparticles according to an embodiment of the present invention.

FIG. 16 is a TEM image of the core/shell/shell/shell upconversion nanophosphor synthesized in Embodiment 9 of the present invention. The TEM image shows that a particle diameter is additionally increased due to the formation of the shell around the core/shell/shell structure.

<Embodiment 10> Synthesis of Core/Shell/Shell/Shell/Shell Upconversion Nanophosphor In Embodiment 10, a core/shell/shell/shell/shell nanophosphor using, as cores, the $NaErF_4:Tm^{3+}/NaYF/NaYF_4:Yb^{3+},Er^{3+}/NaYF_4:Nd^{3+},Yb^{3+}$ nanoparticles synthesized in Embodiment 9, and including a $NaYF_4$ compound was synthesized. The shells including the $NaYF_4$ compound synthesized in Embodiment 10 may be crystalline shells (second intermediate layers) represented by Chemical Formula 5.

1.5 mmol of yttrium chloride hydrate ($YCl_3.6H_2O$) was mixed with a solution including oleic acid and 1-octadecene and heat treatment was performed at 150° C. for 30 minutes to prepare a mixture solution including a lanthanide complex (first mixture solution preparation step).

A second mixture solution was prepared by mixing the first mixture solution with the solution including the $NaEr_{0.995}F_4:Tm^{3+}_{0.005}/NaYF/NaYF_4:Yb^{3+}$, $Er^{3+}/NaYF_4$: $Nd^{3+},Yb^{3+}$ nanoparticles synthesized in Embodiment 9.

15 ml of a methanol solution including 3.75 mmol of sodium hydroxide and 6 mmol of ammonium fluoride was prepared (third mixture solution preparation step) and then was mixed with the mixture solution including the lanthanide complex (reaction solution preparation step).

After sufficiently mixed, methanol was removed and then heat treatment was performed in an inert gas atmosphere. In this case, when the heat treatment was performed at a temperature lower than 200° C., single-phase hexagonal nanocrystals might not be completely formed and thus the phosphor might not exhibit strong emission. When the heat treatment was performed at a temperature higher than 370° C., aggregation of particles due to overreaction might cause very large and non-uniform particle diameters and thus brightness might be reduced. Therefore, the heat treatment would be performed at a temperature of 200° C. to 370° C. for 10 minutes to 4 hours (nanoparticle formation step). After the heat treatment was finished and a cooling process was performed to a room temperature, a colloidal nanophosphor having a diameter of 1 nm to 60 nm was obtained. The nanophosphor obtained as described above was washed with acetone or ethanol and then was dispersed and stored in a non-polar solvent such as hexane, toluene, or chloroform.

Figure 17:
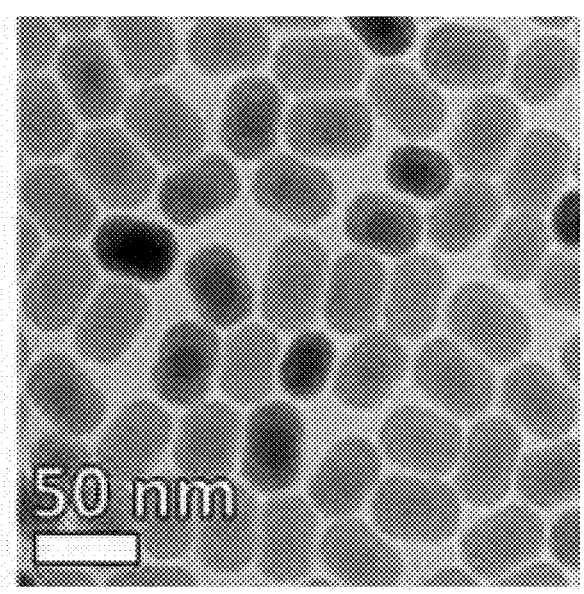
FIG. 17 is a TEM image of core/shell/shell/shell/shell nanoparticles according to an embodiment of the present invention.

FIG. 17 is a TEM image of the core/shell/shell/shell/shell upconversion nanophosphor synthesized in Embodiment 10 of the present invention. The TEM image shows that a particle diameter is additionally increased due to the formation of the shell around the core/shell/shell/shell structure.

<Embodiment 11> Synthesis of Core/Shell/Shell/Shell/Shell/Shell Red-/Green-/Blue-Emitting Upconversion Nanophosphor In Embodiment 11, a core/shell/shell/shell/shell/shell nanophosphor using, as cores, the $NaErF_4:Tm^{3+}/NaYF/NaYF_4:Yb^{3+}$, $Er^{3+}/NaYF_4:Nd^{3+},Yb^{3+}/NaYF_4$ nanoparticles synthesized in Embodiment 10, and including a $NaYbF_4:Tm^{3+}$ compound was synthesized. The $NaYbF_4:Tm^{3+}$ compound synthesized in Embodiment 11 may be understood as, for example, a $NaYb_{0.99}F_4:Tm^{3+}_{0.01}$ compound. The shells including the $NaYbF_4:Tm^{3+}$ compound synthesized in Embodiment 11 may be blue-emitting shells (second emission layers) represented by Chemical Formula 6.

1.485 mmol of ytterbium chloride hydrate ($YbCl_3.6H_2O$) and 0.015 mmol of thulium chloride hydrate ($TmCl_3.6H_2O$) were mixed with a solution including oleic acid and 1-octadecene and heat treatment was performed at 150° C. for 30 minutes to prepare a mixture solution including a lanthanide complex (first mixture solution preparation step).

A second mixture solution was prepared by mixing the first mixture solution with the solution including the $NaErF_4:Tm^{3+}/NaYF/NaYF_4:Yb^{3+}$, $Er^{3+}/NaYF_4$: $Nd^{3+}$, $Yb^{3+}/NaYF_4$ nanoparticles synthesized in Embodiment 10.

15 ml of a methanol solution including 3.75 mmol of sodium hydroxide and 6 mmol of ammonium fluoride was prepared (third mixture solution preparation step) and then was mixed with the mixture solution including the lanthanide complex (reaction solution preparation step).

After sufficiently mixed, methanol was removed and then heat treatment was performed in an inert gas atmosphere. In this case, when the heat treatment was performed at a temperature lower than 200° C., single-phase hexagonal nanocrystals might not be completely formed and thus the phosphor might not exhibit strong emission. When the heat treatment was performed at a temperature higher than 370° C., aggregation of particles due to overreaction might cause very large and non-uniform particle diameters and thus brightness might be reduced. Therefore, the heat treatment would be performed at a temperature of 200° C. to 370° C. for 10 minutes to 4 hours (nanoparticle formation step). After the heat treatment was finished and a cooling process was performed to a room temperature, a colloidal nanophosphor having a diameter of 1 nm to 70 nm was obtained. The nanophosphor obtained as described above was washed with acetone or ethanol and then was dispersed and stored in a non-polar solvent such as hexane, toluene, or chloroform.

Figure 18:
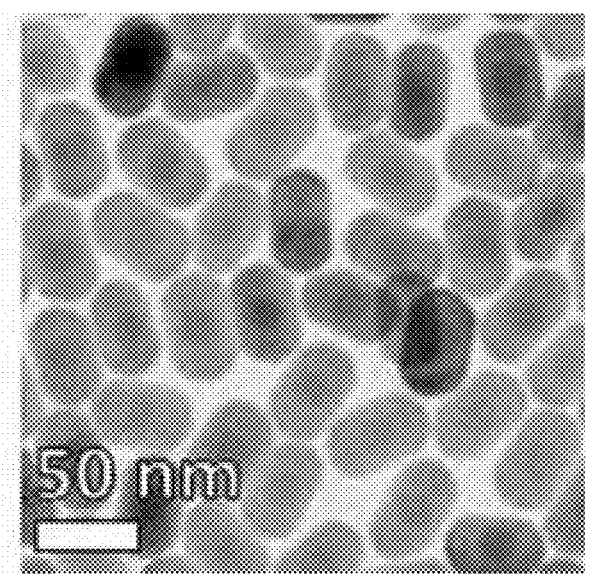
FIG. 18 is a TEM image of core/shell/shell/shell/shell/shell nanoparticles according to an embodiment of the present invention.

FIG. 18 is a TEM image of the core/shell/shell/shell/shell/shell upconversion nanophosphor synthesized in Embodiment 11 of the present invention. The TEM image shows that a particle diameter is additionally increased due to the formation of the shell around the core/shell/shell/shell/shell structure.

<Embodiment 12> Synthesis of Core/Shell/Shell/Shell/Shell/Shell/Shell Red-/Green-/Blue-Emitting Upconversion Nanophosphor In Embodiment 12, a core/shell/shell/shell/shell/shell/shell nanophosphor using, as cores, the $NaErF_4:Tm^{3+}/NaYF/NaYF_4:Yb^{3+},Er^{3+}/NaYF_4:Nd^{3+},Yb^{3+}/NaYF_4/NaYbF_4:Tm^{3+}$ nanoparticles synthesized in Embodiment 11, and including a $NaYF_4$ compound was synthesized. The shells including the $NaYF_4$ compound synthesized in Embodiment 12 may be crystalline shells (protective layers) represented by Chemical Formula 7.

1.5 mmol of yttrium chloride hydrate ($YCl_3.6H_2O$) was mixed with a solution including oleic acid and 1-octadecene and heat treatment was performed at 150° C. for 30 minutes to prepare a mixture solution including a lanthanide complex (first mixture solution preparation step).

A second mixture solution was prepared by mixing the first mixture solution with the solution including the $NaErF_4:Tm^{3+}/NaYF/NaYF_4:Yb^{3+}$, $Er^{3+}/NaYF_4$: $Nd^{3+}$, $Yb^{3+}/NaYF_4/NaYbF_4:Tm^{3+}$ nanoparticles synthesized in Embodiment 11.

15 ml of a methanol solution including 3.75 mmol of sodium hydroxide and 6 mmol of ammonium fluoride was prepared (third mixture solution preparation step) and then was mixed with the mixture solution including the lanthanide complex (reaction solution preparation step).

After sufficiently mixed, methanol was removed and then heat treatment was performed in an inert gas atmosphere. In this case, when the heat treatment was performed at a temperature lower than 200° C., single-phase hexagonal nanocrystals might not be completely formed and thus the phosphor might not exhibit strong emission. When the heat treatment was performed at a temperature higher than 370° C., aggregation of particles due to overreaction might cause very large and non-uniform particle diameters and thus brightness might be reduced. Therefore, the heat treatment would be performed at a temperature of 200° C. to 370° C. for 10 minutes to 4 hours (nanoparticle formation step). After the heat treatment was finished and a cooling process was performed to a room temperature, a colloidal nanophosphor having a diameter of 1 nm to 80 nm was obtained. The nanophosphor obtained as described above was washed with acetone or ethanol and then was dispersed and stored in a non-polar solvent such as hexane, toluene, or chloroform.

Figure 19:
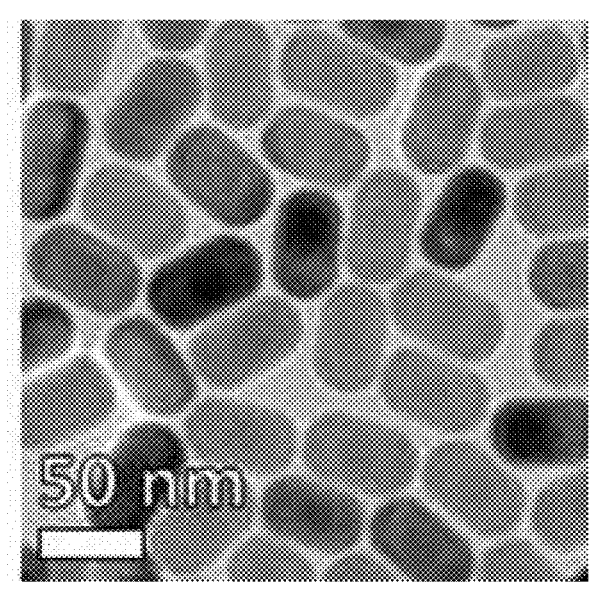
FIG. 19 is a TEM image of core/shell/shell/shell/shell/shell/shell nanoparticles according to an embodiment of the present invention.
Figure 20:
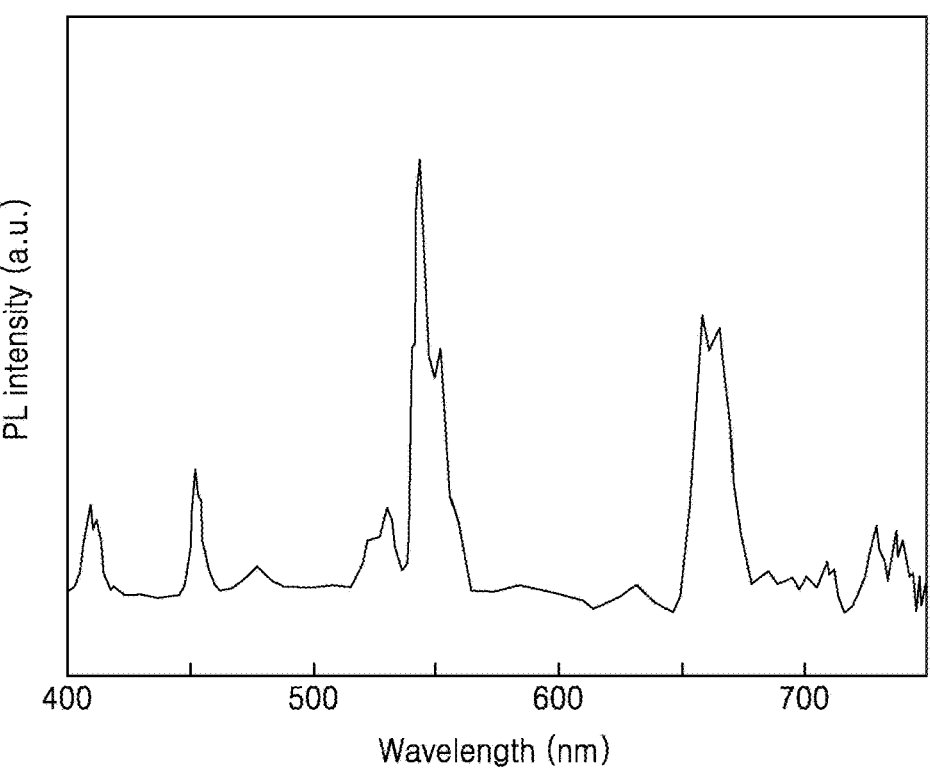
FIG. 20 is a graph showing a PL spectrum of core/shell/shell/shell/shell/shell nanoparticles according to an embodiment of the present invention under an 800 nm NIR excitation condition.
Figure 21:
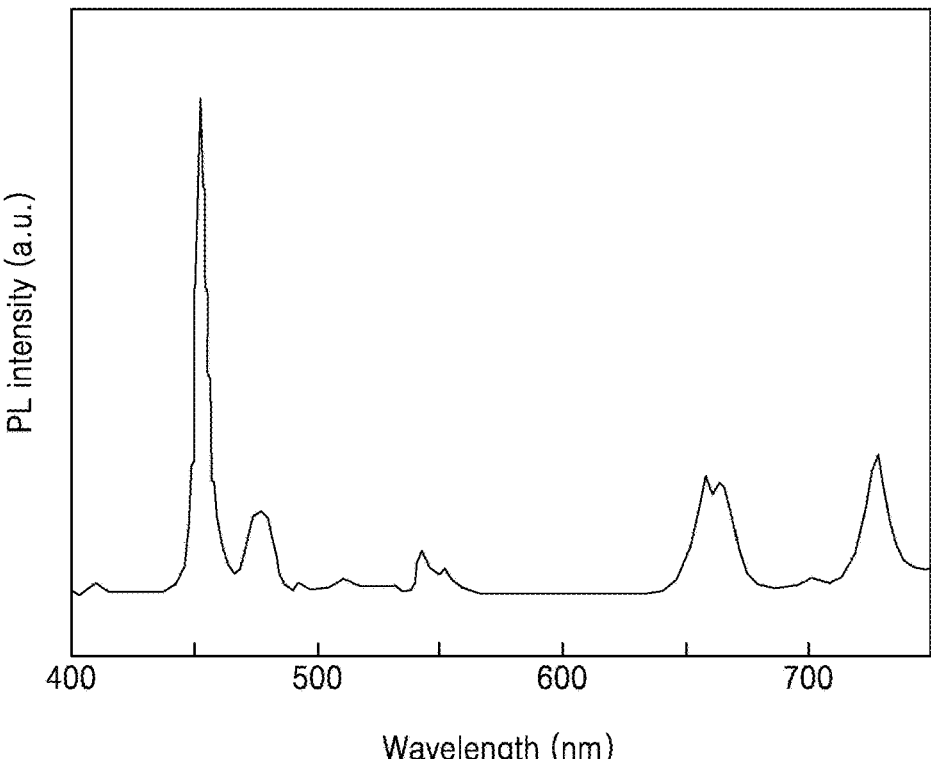
FIG. 21 is a graph showing a PL spectrum of core/shell/shell/shell/shell/shell nanoparticles according to an embodiment of the present invention under a 980 nm NIR excitation condition.
Figure 22:
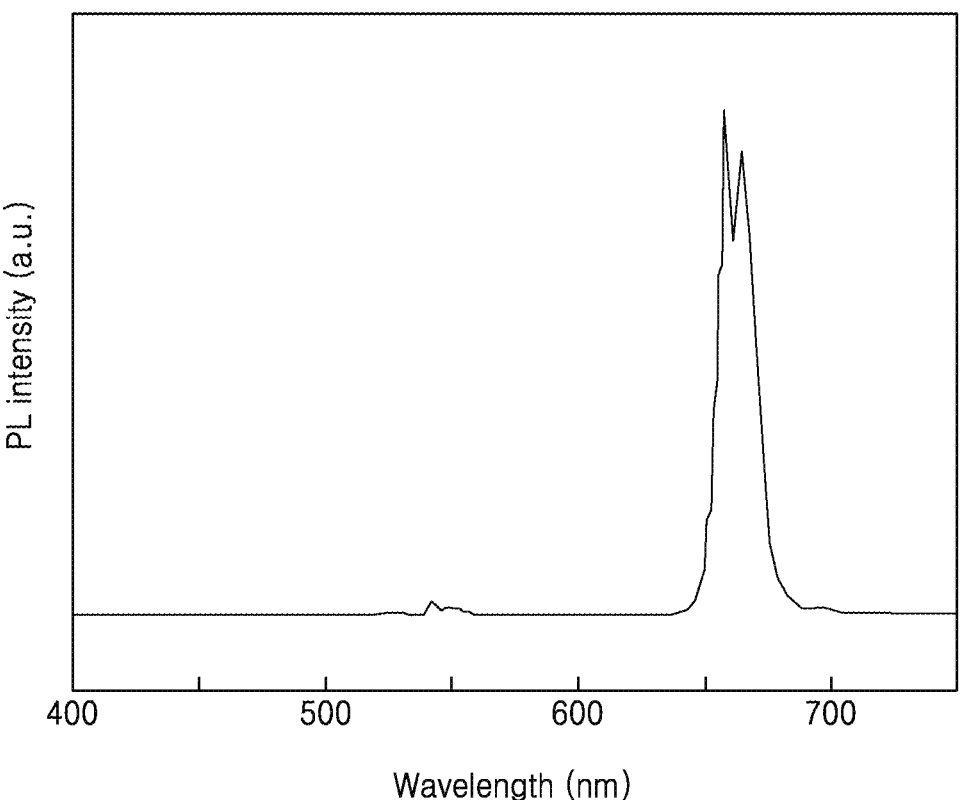
FIG. 22 is a graph showing a PL spectrum of core/shell/shell/shell/shell/shell nanoparticles according to an embodiment of the present invention under a 1532 nm NIR excitation condition.

FIG. 19 is a TEM image of the core/shell/shell/shell/shell/shell/shell upconversion nanophosphor synthesized in Embodiment 12 of the present invention. The TEM image shows that a particle diameter is additionally increased due to the formation of the shell around the core/shell/shell/shell/shell/shell structure. PL spectra of FIGS. 20 to 22 show that the core/shell/shell/shell/shell/shell/shell upconversion nanophosphor synthesized in Embodiment 12 may also emit all of green light (FIG. 20), blue light (FIG. 21), and red light (FIG. 22) based on laser excitation wavelengths.

<Embodiment 13> Synthesis of Blue-Emitting Core Upconversion Nanophosphor

In Embodiment 13, $NaGdF_4$:$Yb^{3+}$,$Tm^{3+}$ nanoparticles were synthesized. The $NaGdF_4$:$Yb^{3+}$,$Tm^{3+}$ nanoparticles synthesized in Embodiment 13 may be understood as, for example, $NaGd_{0.3}F_4$:$Yb^{3+}_{0.69}$,$Tm^{3+}_{0.01}$ nanoparticles. The nanoparticles synthesized in Embodiment 13 may be blue-emitting cores represented by Chemical Formula 8.

Initially, 0.3 mmol of gadolinium chloride hydrate ($GdCl_3$.$6H_2O$), 0.69 mmol of ytterbium chloride hydrate ($YbCl_3$.$6H_2O$), and 0.01 mmol of thulium chloride hydrate ($TmCl_3$.$6H_2O$) were mixed with a solution including oleic acid and 1-octadecene and heat treatment was performed at 150° C. for 30 minutes to prepare a mixture solution including a lanthanide complex (first mixture solution preparation step).

10 ml of a methanol solution including 2.5 mmol of sodium hydroxide and 4 mmol of ammonium fluoride was prepared (second mixture solution preparation step) and then was mixed with the first mixture solution (reaction solution preparation step).

Figure 23:
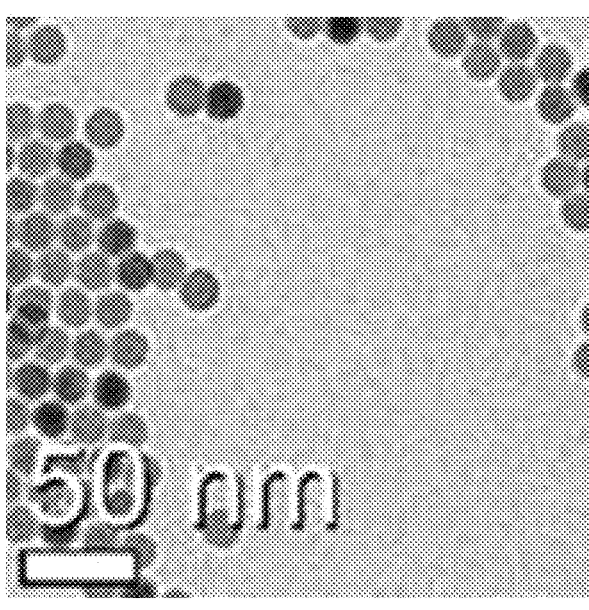
FIG. 23 is a TEM image of core nanoparticles according to an embodiment of the present invention.

After sufficiently mixed, methanol was removed and then heat treatment was performed in an inert gas atmosphere. In this case, when the heat treatment was performed at a temperature lower than 200° C., single-phase hexagonal nanocrystals might not be completely formed and thus the phosphor might not exhibit strong emission. When the heat treatment was performed at a temperature higher than 370° C., aggregation of particles due to overreaction might cause very large and non-uniform particle diameters and thus brightness might be reduced. Therefore, the heat treatment would be performed at a temperature of 200° C. to 370° C. for 10 minutes to 4 hours (nanoparticle formation step). After the heat treatment was finished and a cooling process was performed to a room temperature, a colloidal nanophosphor having a diameter of 1 nm to 25 nm was obtained. The nanophosphor obtained as described above was washed with acetone or ethanol and then was dispersed and stored in a non-polar solvent such as hexane, toluene, or chloroform. FIG. 23 is a TEM image of the upconversion nanophosphor synthesized in Embodiment 13, and it is shown that a core nanophosphor having a uniform diameter of about 17 nm is synthesized.

<Embodiment 14> Synthesis of Core/Shell Upconversion Nanophosphor Through Formation of Fluoride Shell In Embodiment 14, a core/shell ($NaGdF_4$:$Yb^{3+}$,$Tm^{3+}$/$NaYF_4$) nanophosphor using, as cores, the $NaGdF_4$:$Yb^{3+}$, $Tm^{3+}$ nanoparticles synthesized in Embodiment 13, and including a fluoride compound was synthesized. The shells synthesized in Embodiment 14 may be crystalline shells represented by Chemical Formula 9.

1 mmol of yttrium chloride hydrate ($YCl_3$.$6H_2O$) was mixed with a solution including oleic acid and 1-octadecene and heat treatment was performed at 150° C. for 30 minutes to prepare a mixture solution including a lanthanide complex (first mixture solution preparation step).

A second mixture solution was prepared by mixing the first mixture solution with the solution including the $NaGdF_4$:$Yb^{3+}$,$Tm^{3+}$ nanoparticles synthesized in Embodiment 13.

10 ml of a methanol solution including 2.5 mmol of sodium hydroxide and 4 mmol of ammonium fluoride was prepared (third mixture solution preparation step) and then was mixed with the mixture solution including the lanthanide complex (reaction solution preparation step).

After sufficiently mixed, methanol was removed and then heat treatment was performed in an inert gas atmosphere. In this case, when the heat treatment was performed at a temperature lower than 200° C., single-phase hexagonal nanocrystals might not be completely formed and thus the phosphor might not exhibit strong emission. When the heat treatment was performed at a temperature higher than 370° C., aggregation of particles due to overreaction might cause very large and non-uniform particle diameters and thus brightness might be reduced. Therefore, the heat treatment would be performed at a temperature of 200° C. to 370° C. for 10 minutes to 4 hours (nanoparticle formation step). After the heat treatment was finished and a cooling process was performed to a room temperature, a colloidal nanophosphor having a diameter of 1 nm to 30 nm was obtained. The nanophosphor obtained as described above was washed with acetone or ethanol and then was dispersed and stored in a non-polar solvent such as hexane, toluene, or chloroform.

Figure 24:
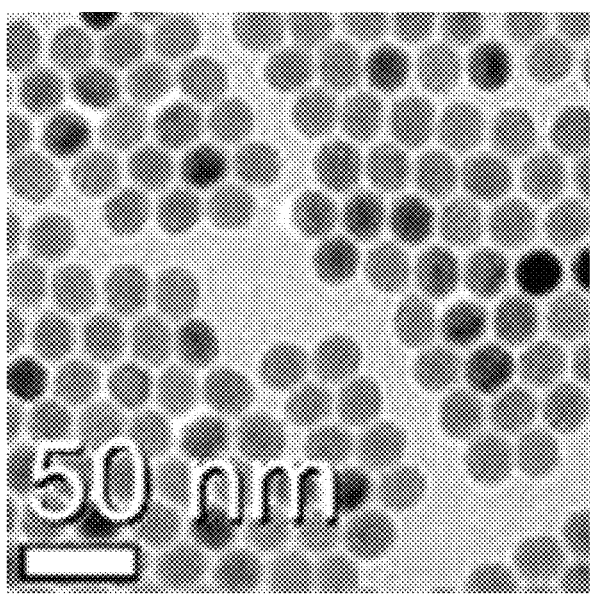
FIG. 24 is a TEM image of core/shell nanoparticles according to an embodiment of the present invention.

FIG. 24 is a TEM image of the core/shell upconversion nanophosphor synthesized in Embodiment 14, and it is shown that a core/shell nanophosphor having a uniform diameter of about 24 nm is synthesized.

<Embodiment 15> Synthesis of Core/Shell/Shell Upconversion Nanophosphor

In Embodiment 15, a core/shell/shell ($NaGdF_4$:$Yb^{3+}$, $Tm^{3+}$/$NaYF_4$/$NaYF_4$:$Yb^{3+}$,$Er^{3+}$) nanophosphor using, as cores, the $NaGdF_4$:$Yb^{3+}$,$Tm^{3+}$/$NaYF_4$ nanoparticles synthesized in Embodiment 14, and including a $NaYF_4$:$Yb^{3+}$,$Er^{3+}$ compound was synthesized. The $NaYF_4$:$Yb^{3+}$,$Er^{3+}$ compound synthesized in Embodiment 15 may be understood as, for example, a $NaY_{0.8}F_4$:$Yb^{3+}_{0.18}$,$Er^{3+}_{0.02}$ compound. The $NaYF_4$:$Yb^{3+}$,$Er^{3+}$ shells synthesized in Embodiment 15 may be green-emitting shells having a $Yb^{3+}$, $Er^{3+}$-co-doped crystalline composition represented by Chemical Formula 10.

0.8 mmol of yttrium chloride hydrate ($YCl_3$.$6H_2O$), 0.18 mmol of ytterbium chloride hydrate ($YbCl_3$.$6H_2O$), and 0.02 mmol of erbium chloride hydrate ($ErCl_3$.$6H_2O$) were mixed with a solution including oleic acid and 1-octadecene and heat treatment was performed at 150° C. for 30 minutes to prepare a mixture solution including a lanthanide complex (first mixture solution preparation step).

A second mixture solution was prepared by mixing the first mixture solution with the solution including the $NaGdF_4$:$Yb^{3+}$,$Tm^{3+}$/$NaYF_4$ nanoparticles synthesized in Embodiment 14.

10 ml of a methanol solution including 2.5 mmol of sodium hydroxide and 4 mmol of ammonium fluoride was prepared (third mixture solution preparation step) and then was mixed with the mixture solution including the lanthanide complex (reaction solution preparation step).

After sufficiently mixed, methanol was removed and then heat treatment was performed in an inert gas atmosphere. In this case, when the heat treatment was performed at a temperature lower than 200° C., single-phase hexagonal nanocrystals might not be completely formed and thus the phosphor might not exhibit strong emission. When the heat treatment was performed at a temperature higher than 370° C., aggregation of particles due to overreaction might cause very large and non-uniform particle diameters and thus brightness might be reduced. Therefore, the heat treatment would be performed at a temperature of 200° C. to 370° C. for 10 minutes to 4 hours (nanoparticle formation step). After the heat treatment was finished and a cooling process was performed to a room temperature, a colloidal nanophosphor having a diameter of 1 nm to 40 nm was obtained. The nanophosphor obtained as described above was washed with acetone or ethanol and then was dispersed and stored in a non-polar solvent such as hexane, toluene, or chloroform.

Figure 25:
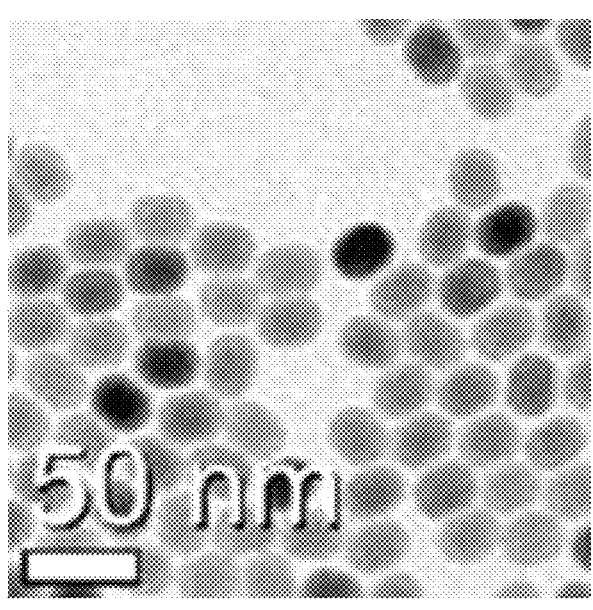
FIG. 25 is a TEM image of core/shell/shell nanoparticles according to an embodiment of the present invention.

FIG. 25 is a TEM image of the core/shell/shell upconversion nanophosphor synthesized in Embodiment 15 of the present invention. The TEM image shows that a particle diameter is additionally increased due to the formation of the shell around the core/shell structure.

<Embodiment 16> Synthesis of Core/Shell/Shell/Shell Upconversion Nanophosphor In Embodiment 16, a core/shell/shell/shell ($NaGdF_4$:$Yb^{3+}$,$Tm^{3+}$/$NaYF_4$/$NaYF_4$:$Yb^{3+}$,$Er^{3+}$/$NaYF_4$:$Nd^{3+}$,$Yb^{3+}$) nanophosphor using, as cores, the $NaGdF_4$:$Yb^{3+}$,$Tm^{3+}$/$NaYF_4$/$NaYF_4$:$Yb^{3+}$,$Er^{3+}$ nanoparticles synthesized in Embodiment 15, and including a $NaYF_4$:$Nd^{3+}$,$Yb^{3+}$ compound was synthesized. The $NaYF_4$:$Nd^{3+}$,$Yb^{3+}$ compound synthesized in Embodiment 16 may be understood as, for example, a $NaY_{0.3}F_4$:$Nd^{3+}_{0.6}$,$Yb^{3+}_{0.1}$ compound. The shells including the $NaYF_4$:$Nd^{3+}$,$Yb^{3+}$ compound synthesized in Embodiment 16 may be absorption shells having a $Nd^{3+}$, $Yb^{3+}$-co-doped crystalline composition represented by Chemical Formula 11.

0.3 mmol of yttrium chloride hydrate ($YCl_3$.$6H_2O$), 0.24 mmol of neodymium chloride hydrate ($NdCl_3$.$6H_2O$), and 0.06 mmol of ytterbium chloride hydrate ($YbCl_3$.$6H_2O$) were mixed with a solution including oleic acid and 1-octadecene and heat treatment was performed at 150° C. for 30 minutes to prepare a mixture solution including a lanthanide complex (first mixture solution preparation step).

A second mixture solution was prepared by mixing the first mixture solution with the solution including the $NaGdF_4$:$Yb^{3+}$,$Tm^{3+}$/$NaYF_4$/$NaYF_4$:$Yb^{3+}$,$Er^{3+}$ nanoparticles synthesized in Embodiment 15.

6 ml of a methanol solution including 1.5 mmol of sodium hydroxide and 2.4 mmol of ammonium fluoride was prepared (third mixture solution preparation step) and then was mixed with the mixture solution including the lanthanide complex (reaction solution preparation step).

After sufficiently mixed, methanol was removed and then heat treatment was performed in an inert gas atmosphere. In this case, when the heat treatment was performed at a temperature lower than 200° C., single-phase hexagonal nanocrystals might not be completely formed and thus the phosphor might not exhibit strong emission. When the heat treatment was performed at a temperature higher than 370° C., aggregation of particles due to overreaction might cause very large and non-uniform particle diameters and thus brightness might be reduced. Therefore, the heat treatment would be performed at a temperature of 200° C. to 370° C. for 10 minutes to 4 hours (nanoparticle formation step). After the heat treatment was finished and a cooling process was performed to a room temperature, a colloidal nanophosphor having a diameter of 1 nm to 45 nm was obtained. The nanophosphor obtained as described above was washed with acetone or ethanol and then was dispersed and stored in a non-polar solvent such as hexane, toluene, or chloroform.

Figure 26:
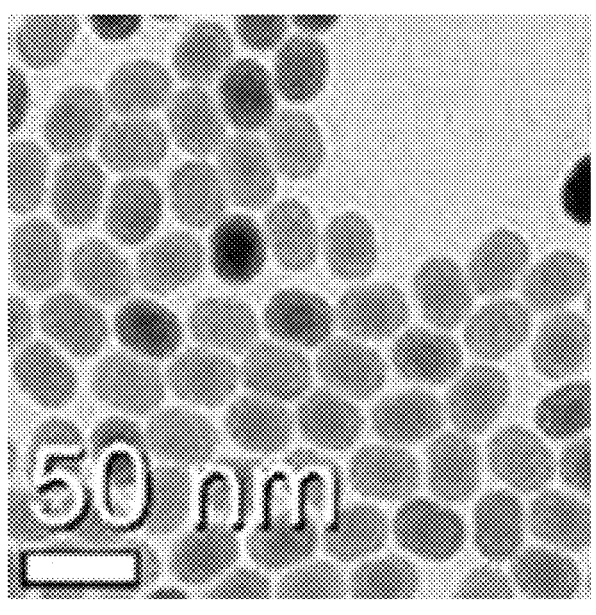
FIG. 26 is a TEM image of core/shell/shell/shell nanoparticles according to an embodiment of the present invention.

FIG. 26 is a TEM image of the core/shell/shell/shell upconversion nanophosphor synthesized in Embodiment 16 of the present invention. The TEM image shows that a particle diameter is additionally increased due to the formation of the shell around the core/shell/shell structure.

<Embodiment 17> Synthesis of Core/Shell/Shell/Shell/Shell Upconversion Nanophosphor In Embodiment 17, a core/shell/shell/shell/shell ($NaGdF_4$:$Yb^{3+}$,$Tm^{3+}$/$NaYF_4$/$NaYF_4$:$Yb^{3+}$, $Er^{3+}$/$NaYF_4$:$Nd^{3+}$,$Yb^{3+}$/$NaYF_4$) nanophosphor using, as cores, the $NaGdF_4$:$Yb^{3+}$,$Tm^{3+}$/$NaYF_4$/$NaYF_4$:$Yb^{3+}$,$Er^{3+}$/$NaYF_4$:$Nd^{3+}$,$Yb^{3+}$ nanoparticles synthesized in Embodiment 16, and including a $NaYF_4$ compound was synthesized. The shells including the $NaYF_4$ compound synthesized in Embodiment 17 may be crystalline shells represented by Chemical Formula 12.

1 mmol of yttrium chloride hydrate ($YCl_3$.$6H_2O$) was mixed with a solution including oleic acid and 1-octadecene and heat treatment was performed at 150° C. for 30 minutes to prepare a mixture solution including a lanthanide complex (first mixture solution preparation step).

A second mixture solution was prepared by mixing the first mixture solution with the solution including the $NaGdF_4$:$Yb^{3+}$,$Tm^{3+}$/$NaYF_4$/$NaYF_4$:$Yb^{3+}$, $Er^{3+}$/$NaYF_4$:$Nd^{3+}$,$Yb^{3+}$ nanoparticles synthesized in Embodiment 16.

10 ml of a methanol solution including 2.5 mmol of sodium hydroxide and 4 mmol of ammonium fluoride was prepared (third mixture solution preparation step) and then was mixed with the mixture solution including the lanthanide complex (reaction solution preparation step).

After sufficiently mixed, methanol was removed and then heat treatment was performed in an inert gas atmosphere. In this case, when the heat treatment was performed at a temperature lower than 200° C., single-phase hexagonal nanocrystals might not be completely formed and thus the phosphor might not exhibit strong emission. When the heat treatment was performed at a temperature higher than 370° C., aggregation of particles due to overreaction might cause very large and non-uniform particle diameters and thus brightness might be reduced. Therefore, the heat treatment would be performed at a temperature of 200° C. to 370° C. for 10 minutes to 4 hours (nanoparticle formation step). After the heat treatment was finished and a cooling process was performed to a room temperature, a colloidal nanophosphor having a diameter of 1 nm to 55 nm was obtained. The nanophosphor obtained as described above was washed with acetone or ethanol and then was dispersed and stored in a non-polar solvent such as hexane, toluene, or chloroform.

Figure 27:
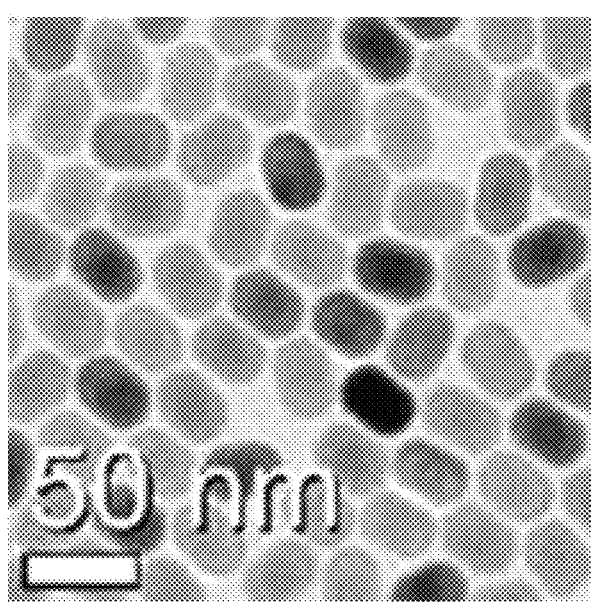
FIG. 27 is a TEM image of core/shell/shell/shell/shell nanoparticles according to an embodiment of the present invention.

FIG. 27 is a TEM image of the core/shell/shell/shell/shell upconversion nanophosphor synthesized in Embodiment 17 of the present invention. The TEM image shows that a particle diameter is additionally increased due to the formation of the shell around the core/shell/shell/shell structure.

<Embodiment 18> Synthesis of
Core/Shell/Shell/Shell/Shell/Shell Upconversion
Nanophosphor In Embodiment 18, a core/shell/shell/shell/shell/shell (NaGdF$_4$:Yb$^{3+}$,Tm$^{3+}$/NaYF$_4$/NaYF$_4$:Yb$^{3+}$, Er$^{3+}$/NaYF$_4$:Nd$^{3+}$,Yb$^{3+}$/NaYF$_4$/NaErF$_4$:Tm$^{3+}$) nanophosphor using, as cores, the NaGdF$_4$:Yb$^{3+}$,Tm$^{3+}$/NaYF$_4$/NaYF$_4$:Yb$^{3+}$, Er$^{3+}$/NaYF$_4$:Nd$^{3+}$,Yb$^{3+}$/NaYF$_4$ nanoparticles synthesized in Embodiment 17, and including a NaErF$_4$:Tm$^{3+}$ compound was synthesized. The NaErF$_4$:Tm$^{3+}$ compound synthesized in Embodiment 18 may be understood as, for example, a NaEr$_{0.995}$F$_4$:Tm$^{3+}$$_{0.005}$ compound. The shells including the NaErF$_4$:Tm$^{3+}$ compound synthesized in Embodiment 18 may be red-emitting shells having a Tm$^{3+}$-doped crystalline composition represented by Chemical Formula 13.

0.995 mmol of erbium chloride hydrate (ErCl$_3$.6H$_2$O) and 0.005 mmol of thulium chloride hydrate (TmCl$_3$.6H$_2$O) were mixed with a solution including oleic acid and 1-octadecene and heat treatment was performed at 150° C. for 30 minutes to prepare a mixture solution including a lanthanide complex (first mixture solution preparation step).

A second mixture solution was prepared by mixing the first mixture solution with the solution including the NaGdF$_4$:Yb$^{3+}$,Tm$^{3+}$/NaYF$_4$/NaYF$_4$:Yb$^{3+}$, Er$^{3+}$/NaYF$_4$:Nd$^{3+}$,Yb$^{3+}$/NaYF$_4$ nanoparticles synthesized in Embodiment 17.

10 ml of a methanol solution including 2.5 mmol of sodium hydroxide and 4 mmol of ammonium fluoride was prepared (third mixture solution preparation step) and then was mixed with the mixture solution including the lanthanide complex (reaction solution preparation step).

After sufficiently mixed, methanol was removed and then heat treatment was performed in an inert gas atmosphere. In this case, when the heat treatment was performed at a temperature lower than 200° C., single-phase hexagonal nanocrystals might not be completely formed and thus the phosphor might not exhibit strong emission. When the heat treatment was performed at a temperature higher than 370° C., aggregation of particles due to overreaction might cause very large and non-uniform particle diameters and thus brightness might be reduced. Therefore, the heat treatment would be performed at a temperature of 200° C. to 370° C. for 10 minutes to 4 hours (nanoparticle formation step). After the heat treatment was finished and a cooling process was performed to a room temperature, a colloidal nanophosphor having a diameter of 1 nm to 65 nm was obtained. The nanophosphor obtained as described above was washed with acetone or ethanol and then was dispersed and stored in a non-polar solvent such as hexane, toluene, or chloroform.

Figure 28:
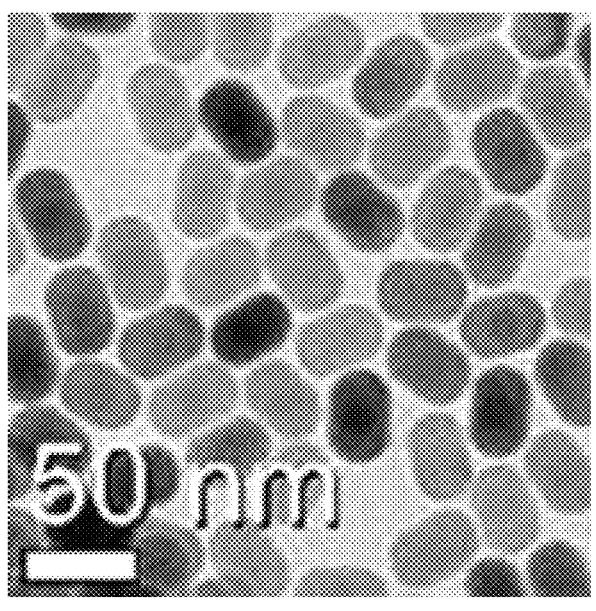
FIG. 28 is a TEM image of core/shell/shell/shell/shell/shell nanoparticles according to an embodiment of the present invention.

FIG. 28 is a TEM image of the core/shell/shell/shell/shell/shell upconversion nanophosphor synthesized in Embodiment 18 of the present invention. The TEM image shows that a particle diameter is additionally increased due to the formation of the shell around the core/shell/shell/shell/shell structure.

<Embodiment 19> Synthesis of
Core/Shell/Shell/Shell/Shell/Shell/Shell
Upconversion Nanophosphor In Embodiment 19, a core/shell/shell/shell/shell/shell/shell (NaGdF$_4$:Yb$^{3+}$,Tm$^{3+}$/NaYF$_4$/NaYF$_4$:Yb$^{3+}$, Er$^{3+}$/

NaYF$_4$: Nd$^{3+}$,Yb$^{3+}$/NaYF$_4$/NaErF$_4$: Tm$^{3+}$/NaYF$_4$) nanophosphor using, as cores, the NaGdF$_4$:Yb$^{3+}$,Tm$^{3+}$/NaYF$_4$/NaYF$_4$:Yb$^{3+}$, Er$^{3+}$/NaYF$_4$:Nd$^{3+}$,Yb$^{3+}$/NaYF$_4$/NaErF$_4$:Tm$^{3+}$ nanoparticles synthesized in Embodiment 18, and including a NaYF$_4$ compound was synthesized. The shells including the NaYF$_4$ compound synthesized in Embodiment 19 may be outermost shells provided as crystalline shells represented by Chemical Formula 14.

2 mmol of yttrium chloride hydrate (YCl$_3$.6H$_2$O) was mixed with a solution including oleic acid and 1-octadecene and heat treatment was performed at 150° C. for 30 minutes to prepare a mixture solution including a lanthanide complex (first mixture solution preparation step).

A second mixture solution was prepared by mixing the first mixture solution with the solution including the NaGdF$_4$:Yb$^{3+}$,Tm$^{3+}$/NaYF$_4$/NaYF$_4$:Yb$^{3+}$, Er$^{3+}$/NaYF$_4$:Nd$^{3+}$,Yb$^{3+}$/NaYF$_4$/NaErF$_4$:Tm$^{3+}$ nanoparticles synthesized in Embodiment 18.

20 ml of a methanol solution including 5 mmol of sodium hydroxide and 8 mmol of ammonium fluoride was prepared (third mixture solution preparation step) and then was mixed with the mixture solution including the lanthanide complex (reaction solution preparation step).

After sufficiently mixed, methanol was removed and then heat treatment was performed in an inert gas atmosphere. In this case, when the heat treatment was performed at a temperature lower than 200° C., single-phase hexagonal nanocrystals might not be completely formed and thus the phosphor might not exhibit strong emission. When the heat treatment was performed at a temperature higher than 370° C., aggregation of particles due to overreaction might cause very large and non-uniform particle diameters and thus brightness might be reduced. Therefore, the heat treatment would be performed at a temperature of 200° C. to 370° C. for 10 minutes to 4 hours (nanoparticle formation step). After the heat treatment was finished and a cooling process was performed to a room temperature, a colloidal nanophosphor having a diameter of 1 nm to 75 nm was obtained. The nanophosphor obtained as described above was washed with acetone or ethanol and then was dispersed and stored in a non-polar solvent such as hexane, toluene, or chloroform.

Figure 29:
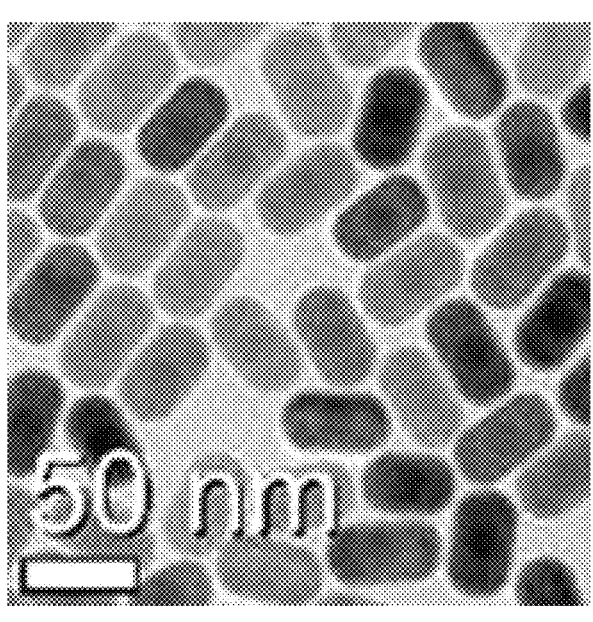
FIG. 29 is a TEM image of core/shell/shell/shell/shell/shell/shell nanoparticles according to an embodiment of the present invention.
Figure 30:
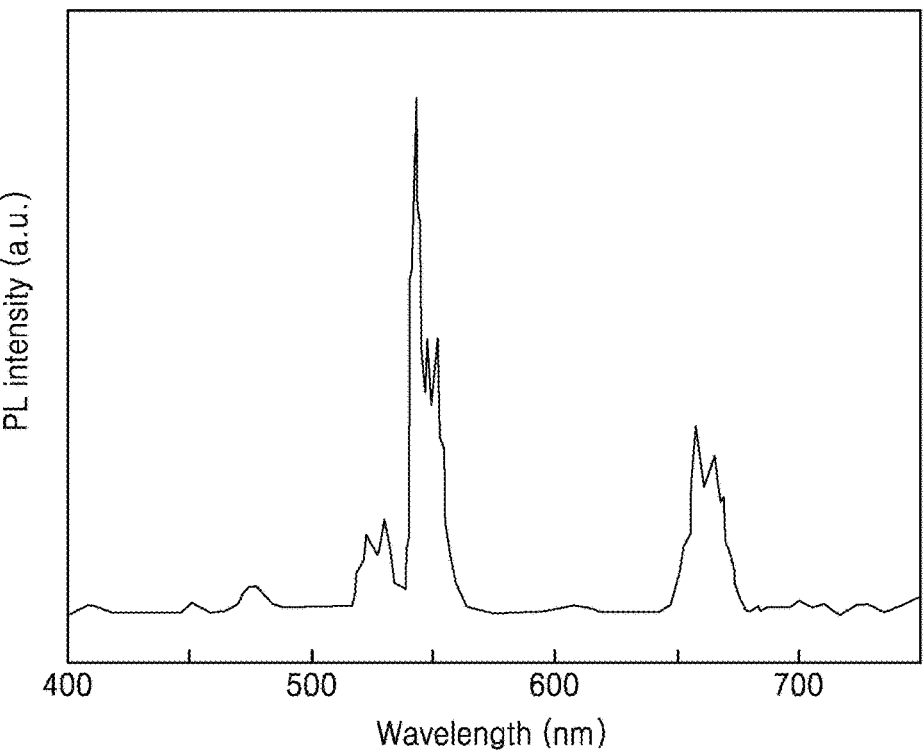
FIG. 30 is a graph showing a PL spectrum of core/shell/shell/shell/shell/shell/shell nanoparticles according to an embodiment of the present invention under an 800 nm NIR excitation condition.
Figure 31:
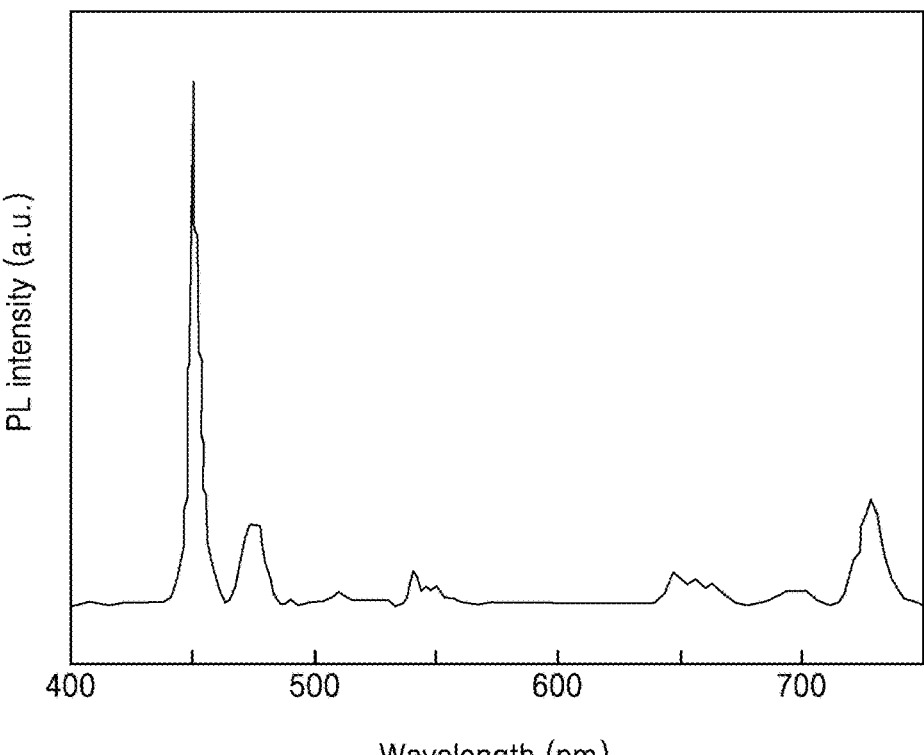
FIG. 31 is a graph showing a PL spectrum of core/shell/shell/shell/shell/shell/shell nanoparticles according to an embodiment of the present invention under a 980 nm NIR excitation condition.
Figure 32:
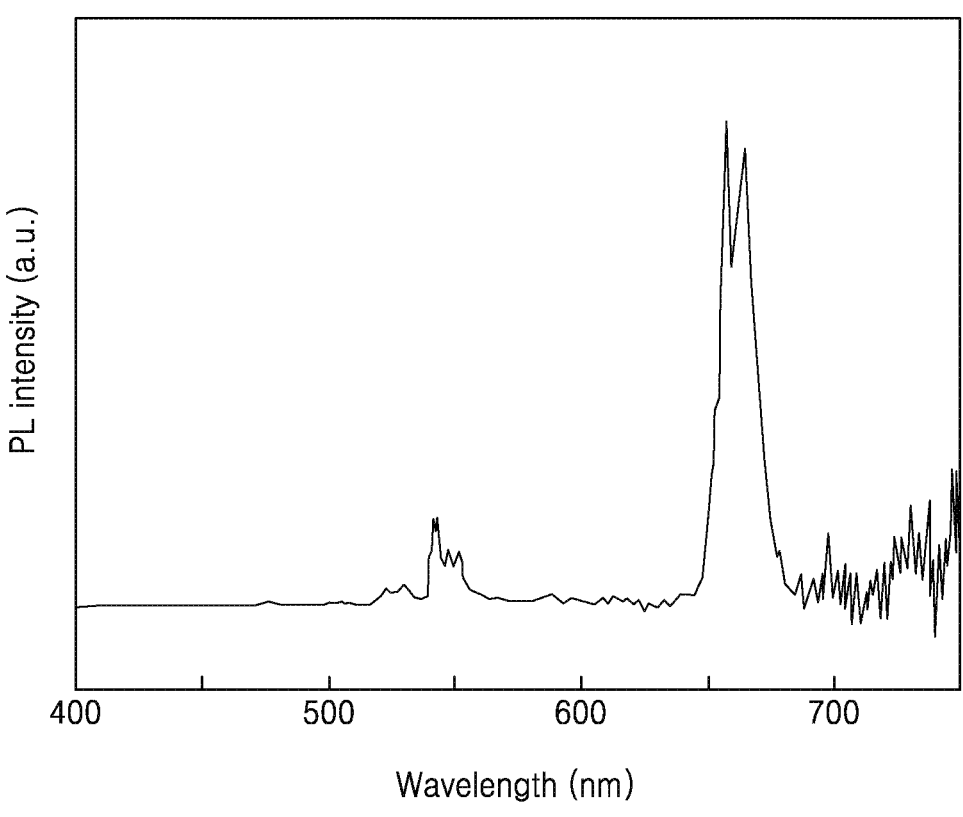
FIG. 32 is a graph showing a PL spectrum of core/shell/shell/shell/shell/shell/shell nanoparticles according to an embodiment of the present invention under a 1532 nm NIR excitation condition.

FIG. 29 is a TEM image of the core/shell/shell/shell/shell/shell/shell upconversion nanophosphor synthesized in Embodiment 19 of the present invention. The TEM image shows that a particle diameter is additionally increased due to the formation of the shell around the core/shell/shell/shell/shell/shell structure. PL spectra of FIGS. 30 to 32 show that the core/shell/shell/shell/shell/shell/shell upconversion nanophosphor synthesized in Embodiment 19 emits green light (see FIG. 30) under 800 nm NIR excitation, emits blue light (see FIG. 31) under 980 nm NIR excitation, and emits red light (see FIG. 32) under 1532 nm NIR excitation.

<Embodiment 20> Synthesis of Polymer
Composite Including
Core/Shell/Shell/Shell/Shell/Shell/Shell
Red-/Green-/Blue-Emitting Upconversion
Nanophosphor A polymer composite was synthesized by mixing polydimethylsiloxane (PDMS) polymer with the NaErF$_4$:Tm$^{3+}$/NaYF$_4$/NaYF$_4$:Yb$^{3+}$/NaLuF$_4$: Nd$^{3+}$,Yb$^{3+}$/NaYF$_4$/NaYbF$_4$:Tm$^{3+}$/NaYF$_4$ core/shell/shell/shell/shell/shell nanophosphor synthesized in Embodiment 7.

The polymer composite was synthesized by mixing 5 mL of Sylgard 184 PDMS polymer and 0.5 mL of a curing agent with 0.4 mL of the core/shell/shell/shell/shell/shell/shell nanophosphor synthesized in Embodiment 7, and then performing heat treatment at 80° C. for 1 hour.

Figure 33:
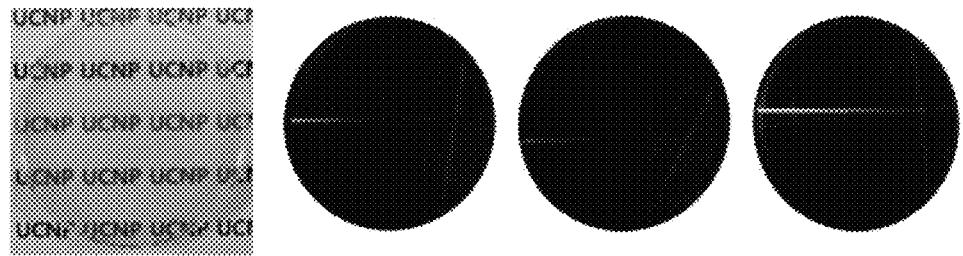
FIG. 33 includes a photographic image of a core/shell/shell/shell/shell/shell/shell nanophosphor-polymer composite according to an embodiment of the present invention, and luminescence images thereof under 800 nm, 980 nm, and 1532 nm NIR excitation conditions.

FIG. 33 includes a photographic image and luminescence images of the core/shell/shell/shell/shell/shell/shell upconversion nanophosphor-polymer composite synthesized in Embodiment 20 of the present invention. It is shown that, like the core/shell/shell/shell/shell/shell/shell upconversion nanophosphor, the nanophosphor-polymer composite also emits green light under 800 nm NIR excitation, emits blue light under 980 nm NIR excitation, and emits red light under 1532 nm NIR excitation.

<Comparative Example 1> Synthesis of Core Upconversion Nanophosphor Doped with 0.25 Mmol of $Yb^{3+}$ and 0.005 Mmol of $Tm^{3+}$ In Comparative Example 1, $NaYF_4$:$Yb^{3+}$,$Tm^{3+}$ nanoparticles were synthesized. The $NaYF_4$:$Yb^{3+}$,$Tm^{3+}$ nanoparticles synthesized in Comparative Example 1 may be understood as, for example, $NaY_{0.745}F_4$:$Yb^{3+}_{0.25}$,$Tm^{3+}_{0.005}$ nanoparticles.

0.745 mmol of yttrium chloride hydrate ($YCl_3.6H_2O$), 0.25 mmol of ytterbium chloride hydrate ($YbCl_3.6H_2O$), and 0.005 mmol of thulium chloride hydrate ($TmCl_3.6H_2O$) were mixed with a solution including oleic acid and 1-octadecene and heat treatment was performed at 150° C. for 30 minutes to prepare a mixture solution including a lanthanide complex (first mixture solution preparation step).

10 ml of a methanol solution including 2.5 mmol of sodium hydroxide and 4 mmol of ammonium fluoride was prepared (second mixture solution preparation step) and then was mixed with the mixture solution including the lanthanide complex (reaction solution preparation step).

After sufficiently mixed, methanol was removed and then heat treatment was performed in an inert gas atmosphere. In this case, when the heat treatment was performed at a temperature lower than 200° C., single-phase hexagonal nanocrystals might not be completely formed and thus the phosphor might not exhibit strong emission. When the heat treatment was performed at a temperature higher than 370° C., aggregation of particles due to overreaction might cause very large and non-uniform particle diameters and thus brightness might be reduced. Therefore, the heat treatment would be performed at a temperature of 200° C. to 370° C. for 10 minutes to 4 hours (nanoparticle formation step). After the heat treatment was finished and a cooling process was performed to a room temperature, a colloidal nanophosphor having a diameter of 10 nm to 40 nm was obtained. The nanophosphor obtained as described above was washed with acetone or ethanol and then was dispersed and stored in a non-polar solvent such as hexane, toluene, or chloroform.

<Comparative Example 2> Synthesis of Blue-Emitting Core/Shell Upconversion Nanophosphor A core/shell nanophosphor using, as cores, the $NaYF_4$:$Yb^{3+}$,$Tm^{3+}$ nanoparticles synthesized in Comparative Example 1, and including a fluoride compound was synthesized.

1 mmol of yttrium chloride hydrate ($YCl_3.6H_2O$) was mixed with a solution including oleic acid and 1-octadecene and heat treatment was performed at 150° C. for 30 minutes to prepare a mixture solution including a lanthanide complex (first mixture solution preparation step).

A second mixture solution was prepared by mixing the first mixture solution with the solution including the $NaYF_4$:$Yb^{3+}$,$Tm^{3+}$ nanoparticles synthesized in Comparative Example 1.

10 ml of a methanol solution including 2.5 mmol of sodium hydroxide and 4 mmol of ammonium fluoride was prepared (third mixture solution preparation step) and then was mixed with the mixture solution including the lanthanide complex (reaction solution preparation step).

After sufficiently mixed, methanol was removed and then heat treatment was performed in an inert gas atmosphere. In this case, when the heat treatment was performed at a temperature lower than 200° C., single-phase hexagonal nanocrystals might not be completely formed and thus the phosphor might not exhibit strong emission. When the heat treatment was performed at a temperature higher than 370° C., aggregation of particles due to overreaction might cause very large and non-uniform particle diameters and thus brightness might be reduced. Therefore, the heat treatment would be performed at a temperature of 200° C. to 370° C. for 10 minutes to 4 hours (nanoparticle formation step). After the heat treatment was finished and a cooling process was performed to a room temperature, a colloidal nanophosphor having a diameter of 20 nm to 50 nm was obtained. The nanophosphor obtained as described above was washed with acetone or ethanol and then was dispersed and stored in a non-polar solvent such as hexane, toluene, or chloroform.

<Comparative Example 3> Synthesis of Core Upconversion Nanophosphor Doped with 0.18 Mmol of $Yb^{3+}$ and 0.02 Mmol of $Er^{3+}$ In Comparative Example 3, $NaYF_4$:$Yb^{3+}$,$Er^{3+}$ nanoparticles were synthesized. The $NaYF_4$:$Yb^{3+}$,$Er^{3+}$ nanoparticles synthesized in Comparative Example 3 may be understood as, for example, $NaY_{0.8}F_4$:$Yb^{3+}_{0.18}$,$Er^{3+}_{0.02}$ nanoparticles.

0.8 mmol of yttrium chloride hydrate ($YCl_3.6H_2O$), 0.18 mmol of ytterbium chloride hydrate ($YbCl_3.6H_2O$), 0.02 mmol of erbium chloride hydrate ($ErCl_3.6H_2O$), and 3.1 mmol of sodium oleate ($C_{18}H_{33}O_2Na$) were weighed, a certain amount of a mixture solvent of water, ethanol, and hexane was added, and then heat treatment was performed at 70° C. to form a lanthanide complex (complex formation step). The complex was mixed with a solution including oleic acid and 1-octadecene and heat treatment was performed at 150° C. for 30 minutes to prepare a mixture solution including the lanthanide complex (first mixture solution preparation step).

10 ml of a methanol solution including 2.5 mmol of sodium hydroxide and 4 mmol of ammonium fluoride was prepared (second mixture solution preparation step) and then was mixed with the mixture solution including the lanthanide complex (reaction solution preparation step).

After sufficiently mixed, methanol was removed and then heat treatment was performed in an inert gas atmosphere. In this case, when the heat treatment was performed at a temperature lower than 200° C., single-phase hexagonal nanocrystals might not be completely formed and thus the phosphor might not exhibit strong emission. When the heat treatment was performed at a temperature higher than 370° C., aggregation of particles due to overreaction might cause very large and non-uniform particle diameters and thus brightness might be reduced. Therefore, the heat treatment would be performed at a temperature of 200° C. to 370° C. for 10 minutes to 4 hours (nanoparticle formation step). After the heat treatment was finished and a cooling process was performed to a room temperature, a colloidal nanophosphor having a diameter of 10 nm to 40 nm was obtained. The nanophosphor obtained as described above was washed with acetone or ethanol and then was dispersed and stored in a non-polar solvent such as hexane, toluene, or chloroform.

<Comparative Example 4> Synthesis of Green-Emitting Core/Shell Upconversion Nanophosphor A core/shell nanophosphor using, as cores, the $NaYF_4$: $Yb^{3+}$,$Er^{3+}$ nanoparticles synthesized in Comparative Example 3, and including a fluoride compound was synthesized.

1 mmol of yttrium chloride hydrate ($YCl_3.6H_2O$) was mixed with a solution including oleic acid and 1-octadecene and heat treatment was performed at 150° C. for 30 minutes to prepare a mixture solution including a lanthanide complex (first mixture solution preparation step).

A second mixture solution was prepared by mixing the first mixture solution with the solution including the $NaYF_4$: $Yb^{3+}$,$Er^{3+}$ nanoparticles synthesized in Comparative Example 3.

10 ml of a methanol solution including 2.5 mmol of sodium hydroxide and 4 mmol of ammonium fluoride was prepared (third mixture solution preparation step) and then was mixed with the mixture solution including the lanthanide complex (reaction solution preparation step).

After sufficiently mixed, methanol was removed and then heat treatment was performed in an inert gas atmosphere. In this case, when the heat treatment was performed at a temperature lower than 200° C., single-phase hexagonal nanocrystals might not be completely formed and thus the phosphor might not exhibit strong emission. When the heat treatment was performed at a temperature higher than 370° C., aggregation of particles due to overreaction might cause very large and non-uniform particle diameters and thus brightness might be reduced. Therefore, the heat treatment would be performed at a temperature of 200° C. to 370° C. for 10 minutes to 4 hours (nanoparticle formation step). After the heat treatment was finished and a cooling process was performed to a room temperature, a colloidal nanophosphor having a diameter of 20 nm to 50 nm was obtained. The nanophosphor obtained as described above was washed with acetone or ethanol and then was dispersed and stored in a non-polar solvent such as hexane, toluene, or chloroform.

<Comparative Example 5> Synthesis of Red-Emitting Core Upconversion Nanophosphor 0.995 mmol of erbium chloride hydrate ($ErCl_3.6H_2O$), 0.005 mmol of thulium chloride hydrate ($TmCl_3.6H_2O$), and 3.1 mmol of sodium oleate ($C_{18}H_{33}O_2Na$) were weighed, a certain amount of a mixture solvent of water, ethanol, and hexane was added, and then heat treatment was performed at 70° C. to form a lanthanide complex (complex formation step). The complex was mixed with a solution including oleic acid and 1-octadecene and heat treatment was performed at 150° C. for 30 minutes to prepare a mixture solution including the lanthanide complex (first mixture solution preparation step).

10 ml of a methanol solution including 2.5 mmol of sodium hydroxide and 4 mmol of ammonium fluoride was prepared (second mixture solution preparation step) and then was mixed with the mixture solution including the lanthanide complex (reaction solution preparation step).

After sufficiently mixed, methanol was removed and then heat treatment was performed in an inert gas atmosphere. In this case, when the heat treatment was performed at a temperature lower than 200° C., single-phase hexagonal nanocrystals might not be completely formed and thus the phosphor might not exhibit strong emission. When the heat treatment was performed at a temperature higher than 370° C., aggregation of particles due to overreaction might cause very large and non-uniform particle diameters and thus brightness might be reduced. Therefore, the heat treatment would be performed at a temperature of 200° C. to 370° C. for 10 minutes to 4 hours (nanoparticle formation step). After the heat treatment was finished and a cooling process was performed to a room temperature, a colloidal nanophosphor having a diameter of 10 nm to 40 nm was obtained. The nanophosphor obtained as described above was washed with acetone or ethanol and then was dispersed and stored in a non-polar solvent such as hexane, toluene, or chloroform.

<Comparative Example 6> Synthesis of Red-Emitting Core/Shell Upconversion Nanophosphor A core/shell nanophosphor using, as cores, the $NaErF_4$: $Tm^{3+}$ nanoparticles synthesized in Comparative Example 5, and including a fluoride compound was synthesized. The $NaErF_4$:$Tm^{3+}$ nanoparticles synthesized in Comparative Example 5 may be understood as, for example, $NaEr_{0.995}F_4$: $Tm^{3+}_{0.005}$ nanoparticles.

1 mmol of yttrium chloride hydrate ($YCl_3.6H_2O$) was mixed with a solution including oleic acid and 1-octadecene and heat treatment was performed at 150° C. for 30 minutes to prepare a mixture solution including a lanthanide complex (first mixture solution preparation step).

A second mixture solution was prepared by mixing the first mixture solution with the solution including the $NaErF_4$:$Tm^{3+}$ nanoparticles synthesized in Comparative Example 5.

10 ml of a methanol solution including 2.5 mmol of sodium hydroxide and 4 mmol of ammonium fluoride was prepared (third mixture solution preparation step) and then was mixed with the mixture solution including the lanthanide complex (reaction solution preparation step).

After sufficiently mixed, methanol was removed and then heat treatment was performed in an inert gas atmosphere. In this case, when the heat treatment was performed at a temperature lower than 200° C., single-phase hexagonal nanocrystals might not be completely formed and thus the phosphor might not exhibit strong emission. When the heat treatment was performed at a temperature higher than 370° C., aggregation of particles due to overreaction might cause very large and non-uniform particle diameters and thus brightness might be reduced. Therefore, the heat treatment would be performed at a temperature of 200° C. to 370° C. for 10 minutes to 4 hours (nanoparticle formation step). After the heat treatment was finished and a cooling process was performed to a room temperature, a colloidal nanophosphor having a diameter of 20 nm to 50 nm was obtained. The nanophosphor obtained as described above was washed with acetone or ethanol and then was dispersed and stored in a non-polar solvent such as hexane, toluene, or chloroform.

<Comparative Example 7> Synthesis of Blue-, Green-, and Red-Emitting Core/Shell Upconversion Nanophosphor Mixture Solution A mixture solution of blue-, green-, and red-emitting upconversion nanophosphors was synthesized by mixing 225 μL of the $NaYF_4$:$Yb^{3+}$,$Tm^{3+}$/$NaYF_4$ core/shell nanoparticle solution, 375 μL of the NaYF$_4$:Yb$^{3+}$,Er$^{3+}$/NaYF$_4$ core/shell nanoparticle solution, and 400 μL of the NaErF$_4$:Tm$^{3+}$/NaYF$_4$ core/shell nanoparticle solution, which were synthesized in Comparative Examples 1 to 6.

Figure 34:
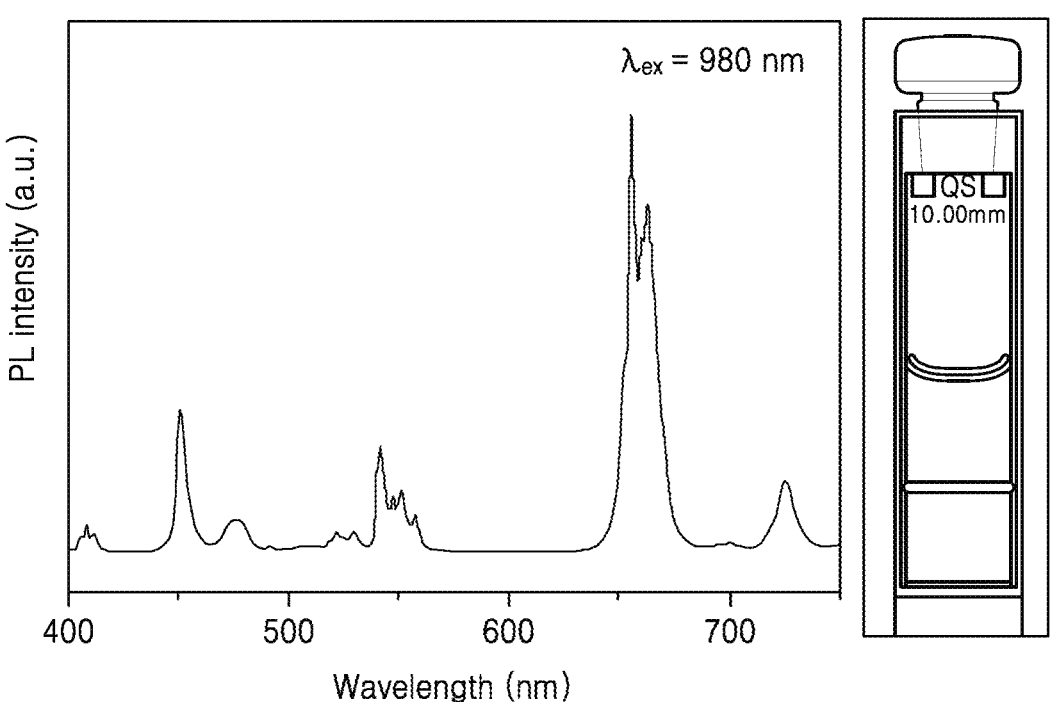
FIG. 34 includes a PL spectrum and a luminescence image of a nanophosphor according to a comparative example of the present invention under a 980 nm NIR excitation condition.

A PL spectrum and an image of FIG. 34 show that the upconversion nanophosphor solution synthesized in Comparative Example 7 does not emit blue, green, or red light but emits white light in which blue, green, and red are mixed.

As described above in detail, according to the present invention, red, green, and blue light may be emitted from one core/multishell nanophosphor particle, and the emission color may be tuned by controlling a laser excitation wavelength. In addition, various colors may be emitted based on combinations of red, green, and blue by combining two or more laser excitation wavelengths, and thus a full-color tunable upconversion nanophosphor may be obtained.

The upconversion nanophosphor synthesized according to the present invention may be not only applied to the field of transparent displays but also utilized in the field of security using fluorescence by using the characteristics of emitting various colors. Furthermore, because NIR light is used as a light source, the upconversion nanophosphor may be utilized in the fields of bioimaging contrast agents and disease diagnosis.

While the present invention has been particularly shown and described with reference to embodiments thereof, it will be understood by one of ordinary skill in the art that various changes in form and details may be made therein without departing from the scope of the invention as defined by the following claims.

The embodiments should be considered in a descriptive sense only and not for purposes of limitation. Therefore, the scope of the invention is defined not by the detailed description of the invention but by the following claims, and all differences within the scope will be construed as being included in the present invention.

What is claimed is:

1. A hexagonal core/multishell upconversion nanophosphor capable of being excited by 800±20 nm, 980±20 nm, and 1530±20 nm near-infrared (NIR) light to emit blue, green, red, and combinations thereof, wherein the nanophosphor has a core/multishell structure comprising:

a core provided as a Tm$^{3+}$-doped fluoride nanoparticle represented by Chemical Formula 1;

a crystalline shell represented by Chemical Formula 2;

a green-emitting shell having a Yb$^{3+}$, Er$^{3+}$-co-doped crystalline composition represented by Chemical Formula 3;

an absorption shell having a Nd$^{3+}$, Yb$^{3+}$-co-doped crystalline composition represented by Chemical Formula 4;

a crystalline shell represented by Chemical Formula 5;

a blue-emitting shell having a Tm$^{3+}$-doped crystalline composition represented by Chemical Formula 6; and an outermost shell provided as a crystalline shell represented by Chemical Formula 7;

$$NaEr_{1-a-b}L_bF_4:Tm^{3+}_a \qquad \text{[Chemical Formula 1]}$$

(In Chemical Formula 1, a is a real number of 0≤a≤0.5, b is a real number of 0<b<1 and 0≤a+b<1 and is selected within a range satisfying a+b<1, and L is any one selected from the group consisting of yttrium (Y), lanthanum (La), cerium (Ce), praseodymium (Pr), neodymium (Nd), promethium (Pm), samarium (Sm), europium (Eu), terbium (Tb), dysprosium (Dy), holmium (Ho), ytterbium (Yb), lutetium (Lu), gadolinium (Gd), and combinations thereof)

$$NaY_{1-c}M_cF_4 \qquad \text{[Chemical Formula 2]}$$

(In Chemical Formula 2, c is a real number of 0≤c≤1, M is any one selected from the group consisting of rare-earth elements and combinations thereof, and the rare-earth elements for M comprise any one selected from the group consisting of La, Ce, Pr, Nd, Pm, Sm, Eu, Gd, Tb, Dy, Ho, erbium (Er), thulium (Tm), Yb, and Lu)

$$NaY_{1-d-e-f}N_fF_4:Yb^{3+}_d,Er^{3+}_e \qquad \text{[Chemical Formula 3]}$$

(In Chemical Formula 3, d is a real number of 0<d≤1, e is a real number of 0≤e≤1, d and e are selected within a range satisfying a condition of 0<d+e≤1, f is a real number of 0≤f<1 and is selected within a range satisfying a condition of 0<d+e+f≤1, N is any one selected from the group consisting of rare-earth elements and combinations thereof, and the rare-earth elements for N comprise any one selected from the group consisting of La, Ce, Pr, Nd, Pm, Sm, Eu, Gd, Tb, Dy, Ho, Tm, and Lu)

$$NaLu_{1-g-h-i}Q_iF_4:Nd^{3+}_g,Yb^{3+}_h \qquad \text{[Chemical Formula 4]}$$

(In Chemical Formula 4, g is a real number of 0<g≤1, h is a real number of 0≤h≤0.5 and is selected within a range satisfying a condition of 0<g+h≤1, i is a real number of 0<i<1 and is selected within a range satisfying a condition of 0<g+h+i≤1, Q is any one selected from the group consisting of rare-earth elements and combinations thereof, and the rare-earth elements for Q comprise any one selected from the group consisting of La, Ce, Pr, Pm, Sm, Eu, Gd, Tb, Dy, Ho, Er, Tm, and Y)

$$NaY_{1-j}R_jF_4 \qquad \text{[Chemical Formula 5]}$$

(In Chemical Formula 5, j is selected within a range satisfying a condition of a real number of 0≤j≤1, R is any one selected from the group consisting of rare-earth elements and combinations thereof, and the rare-earth elements for R comprise any one selected from the group consisting of La, Ce, Pr, Nd, Pm, Sm, Eu, Gd, Tb, Dy, Ho, Er, Tm, Yb, and Lu, $$NaYb_{1-k-l}T_lF_4:Tm^{3+}_k \qquad \text{[Chemical Formula 6]}$$

(In Chemical Formula 6, k is a real number of 0<k<1, l is a real number of 0≤l<1 and is selected within a range satisfying a condition of 0<k+l<1, T is any one selected from the group consisting of rare-earth elements and combinations thereof, and the rare-earth elements for T comprise any one selected from the group consisting of Y, La, Ce, Pr, Nd, Pm, Sm, Eu, Gd, Tb, Dy, Ho, Er, and Lu)

$$NaY_{1-m}Z_mF_4 \qquad \text{[Chemical Formula 7]}$$

(In Chemical Formula 7, m is selected within a range satisfying a condition of a real number of 0≤m≤1, Z is any one selected from the group consisting of rare-earth elements and combinations thereof, and the rare-earth elements for Z comprise any one selected from the group consisting of La, Ce, Pr, Nd, Pm, Sm, Eu, Gd, Tb, Dy, Ho, Er, Tm, Yb, and Lu).

2. The upconversion nanophosphor of claim 1, wherein the nanophosphor has a hexagonal structure and comprises a structure of a red-emitting core, a green-emitting shell, and a blue-emitting shell.

3. The upconversion nanophosphor of claim 2, wherein the green-emitting shell is provided on at least a partial surface of the red-emitting core, and the blue-emitting shell is provided on at least a partial surface of the red-emitting core and the green-emitting shell.

4. The upconversion nanophosphor of claim 2, wherein the nanophosphor comprises a crystalline shell between the red-emitting core, the green-emitting shell, and the blue-emitting shell, and on an outermost surface.

5. The upconversion nanophosphor of claim 1, wherein the nanophosphor has a hexagonal structure and comprises a structure of a blue-emitting core, a green-emitting shell, and a red-emitting shell.

6. The upconversion nanophosphor of claim 5, wherein the green-emitting shell is provided on at least a partial surface of the blue-emitting core, and the red-emitting shell is provided on at least a partial surface of the blue-emitting core and the green-emitting shell.

7. The upconversion nanophosphor of claim 5, wherein the nanophosphor comprises a crystalline shell between the blue-emitting core, the green-emitting shell, and the red-emitting shell, and on an outermost surface.

8. The upconversion nanophosphor of claim 1, wherein the nanophosphor has a core/multishell structure comprising:

a core provided as a nanoparticle represented by Chemical Formula 1;

a first shell provided on at least a partial surface of the core and made of a compound represented by Chemical Formula 2;

a second shell provided on at least a partial surface of the core and the first shell and made of a compound represented by Chemical Formula 3;

a third shell provided on at least a partial surface of the core, the first shell, and the second shell and made of a compound represented by Chemical Formula 4;

a fourth shell provided on at least a partial surface of the core, the first shell, the second shell, and the third shell and made of a compound represented by Chemical Formula 5;

a fifth shell provided on at least a partial surface of the core, the first shell, the second shell, the third shell, and the fourth shell and made of a compound represented by Chemical Formula 6; and a sixth shell provided on at least a partial surface of the core, the first shell, the second shell, the third shell, the fourth shell, and the fifth shell and made of a compound represented by Chemical Formula 7.

9. A hexagonal core/multishell upconversion nanophosphor capable of being excited by 800±20 nm, 980±20 nm, and 1530±20 nm near-infrared (NIR) light to emit blue, green, red, and combinations thereof, wherein the nanophosphor has a core/multishell structure comprising:

a core provided as a $Tm^{3+}$-doped fluoride nanoparticle represented by Chemical Formula 8;

a crystalline shell represented by Chemical Formula 9;

a green-emitting shell having a $Yb^{3+}$, $Er^{3+}$-co-doped crystalline composition represented by Chemical Formula 10;

an absorption shell having a $Nd^{3+}$, $Yb^{3+}$-co-doped crystalline composition represented by Chemical Formula 11;

a crystalline shell represented by Chemical Formula 12;

a red-emitting shell having a $Tm^{3+}$-doped crystalline composition represented by Chemical Formula 13; and an outermost shell provided as a crystalline shell represented by Chemical Formula 14, $$NaGd_{1-k-l-m}T_mF_4:Yb_l,Tm^{3+}_k \qquad \text{[Chemical Formula 8]}$$

(In Chemical Formula 8, k is a real number of $0<k<1$, 1 is a real number of $0<l<1$, m is a real number of $0\leq m<1$, 1 and m are selected within a range satisfying a condition of $0<k+1+m\leq1$, and T is any one selected from the group consisting of Y, La, Ce, Pr, Nd, Pm, Sm, Eu, Tb, Dy, Ho, Er, Lu, and combinations thereof)

$$NaY_{1-c}M_cF_4 \qquad \text{[Chemical Formula 9]}$$

(In Chemical Formula 9, c is a real number of $0\leq c\leq1$, Mis any one selected from the group consisting of rare-earth elements and combinations thereof, and the rare-earth elements comprise any one selected from the group consisting of La, Ce, Pr, Nd, Pm, Sm, Eu, Gd, Tb, Dy, Ho, Er, Tm, Yb, and Lu)

$$NaY_{1-d-e-f}N_fF_4:Yb^{3+}_d,Er^{3+}_e \qquad \text{[Chemical Formula 10]}$$

(In Chemical Formula 10, d is a real number of $0\leq d\leq1$, and e is a real number of $0\leq e\leq1$, d and e are selected within a range satisfying a condition of $0<d+e\leq1$, f is a real number of $0\leq f<1$ and is selected within a range satisfying a condition of $0<d+e+f\leq1$, Nis any one selected from the group consisting of rare-earth elements and combinations thereof, and the rare-earth elements for N comprise any one selected from the group consisting of La, Ce, Pr, Nd, Pm, Sm, Eu, Gd, Tb, Dy, Ho, Tm, and Lu)

$$NaLu_{1-g-h-i}Q_iF_4:Nd^{3+}_g,Yb^{3+}_h \qquad \text{[Chemical Formula 11]}$$

(In Chemical Formula 11, g is a real number of $0<g\leq1$, h is a real number of $0\leq h\leq0.5$ and is selected within a range satisfying a condition of $0<g+h\leq1$, i is a real number of $0\leq i<1$ and is selected within a range satisfying a condition of $0<g+h+i\leq1$, Q is any one selected from the group consisting of rare-earth elements and combinations thereof, and the rare-earth elements for Q comprise any one selected from the group consisting of La, Ce, Pr, Pm, Sm, Eu, Gd, Tb, Dy, Ho, Er, Tm, and Y)

$$NaY_{1-j}R_jF_4 \qquad \text{[Chemical Formula 12]}$$

(In Chemical Formula 12, j is selected within a range satisfying a condition of a real number of $0\leq j\leq1$, R is any one selected from the group consisting of rare-earth elements and combinations thereof, and the rare-earth elements for R comprise any one selected from the group consisting of La, Ce, Pr, Nd, Pm, Sm, Eu, Gd, Tb, Dy, Ho, Er, Tm, Yb, and Lu)

$$NaEr_{1-a-b}L_bF_4:Tm^{3+}_a \qquad \text{[Chemical Formula 13]}$$

(In Chemical Formula 13, a is a real number of $0\leq a\leq0.5$, b is a real number of $0\leq b<1$ and $0\leq a+b<1$ and is selected within a range satisfying $a+b<1$, and L is any one selected from the group consisting of Y, La, Ce, Pr, Nd, Pm, Sm, Eu, Tb, Dy, Ho, Yb, Lu, Gd, and combinations thereof)

$$NaY_{1-m}Z_mF_4 \qquad \text{[Chemical Formula 14]}$$

(In Chemical Formula 14, m is selected within a range satisfying a condition of a real number of $0\leq m\leq1$, Z is any one selected from the group consisting of rare-earth elements and combinations thereof, and the rare-earth elements for Z comprise any one selected from the group consisting of La, Ce, Pr, Nd, Pm, Sm, Eu, Gd, Tb, Dy, Ho, Er, Tm, Yb, and Lu).

10. The upconversion nanophosphor of claim 9, wherein the nanophosphor has a core/multishell structure comprising:

a core provided as a nanoparticle represented by Chemical Formula 8;

a first shell provided on at least a partial surface of the core and made of a compound represented by Chemical Formula 9;

a second shell provided on at least a partial surface of the core and the first shell and made of a compound represented by Chemical Formula 10;

a third shell provided on at least a partial surface of the core, the first shell, and the second shell and made of a compound represented by Chemical Formula 11;

a fourth shell provided on at least a partial surface of the core, the first shell, the second shell, and the third shell and made of a compound represented by Chemical Formula 12;

a fifth shell provided on at least a partial surface of the core, the first shell, the second shell, the third shell, and the fourth shell and made of a compound represented by Chemical Formula 13; and a sixth shell provided on at least a partial surface of the core, the first shell, the second shell, the third shell, the fourth shell, and the fifth shell and made of a compound represented by Chemical Formula 14.

11. The upconversion nanophosphor of claim 1, the nanophosphor emits various colors based on a combination of wavelengths of excitation light.

12. The upconversion nanophosphor of claim 1, wherein the nanophosphor emits various colors based on a combination of a wavelength and output power of excitation light.

13. A polymer composite comprising the upconversion nanophosphor according to claim 1.

14. A display device comprising a polymer composite comprising the upconversion nanophosphor according to claim 1.

15. Anti-counterfeiting code comprising the upconversion nanophosphor according to claim 1.

16. A fluorescent contrast agent comprising the upconversion nanophosphor according to claim 1.

* * * * *